US008401992B2

(12) United States Patent
Hamel

(10) Patent No.: US 8,401,992 B2
(45) Date of Patent: Mar. 19, 2013

(54) COMPUTING PLATFORM BASED ON A HIERARCHY OF NESTED DATA STRUCTURES

(75) Inventor: Greg Hamel, Calgary (CA)

(73) Assignee: IT Actual, Sdn. Bhd., Serdang, Selangor (MY)

( * ) Notice: Subject to any disclaimer, the term of this patent is extended or adjusted under 35 U.S.C. 154(b) by 439 days.

(21) Appl. No.: 12/701,112

(22) Filed: Feb. 5, 2010

(65) Prior Publication Data

US 2010/0205205 A1 Aug. 12, 2010

Related U.S. Application Data

(60) Provisional application No. 61/150,526, filed on Feb. 6, 2009.

(51) Int. Cl.
*G06F 17/30* (2006.01)

(52) U.S. Cl. ........................................................ 707/603

(58) Field of Classification Search ................... 707/603
See application file for complete search history.

(56) References Cited

U.S. PATENT DOCUMENTS

| | | | |
|---|---|---|---|
| 4,803,641 | A | 2/1989 | Hardy et al. |
| 4,849,905 | A | 7/1989 | Loeb et al. |
| 5,228,116 | A | 7/1993 | Harris et al. |
| 5,297,239 | A | 3/1994 | Kurosawa et al. |
| 5,615,309 | A | 3/1997 | Bezek et al. |
| 5,805,775 | A | 9/1998 | Eberman et al. |
| 6,034,692 | A | 3/2000 | Gallery et al. |
| 6,124,864 | A | 9/2000 | Madden et al. |
| 6,216,098 | B1 | 4/2001 | Clancey et al. |
| 6,490,574 | B1 | 12/2002 | Bennett et al. |
| 6,502,134 | B1 | 12/2002 | Makarios et al. |
| 6,553,402 | B1 | 4/2003 | Makarios et al. |

(Continued)

FOREIGN PATENT DOCUMENTS

| | | | |
|---|---|---|---|
| EP | 380317 | B1 | 5/1996 |
| JP | 63086030 | A2 | 4/1988 |

(Continued)

OTHER PUBLICATIONS

Doorenbos, Production Matching for Large Learning Systems, 1995.*

(Continued)

*Primary Examiner* — William Spieler
(74) *Attorney, Agent, or Firm* — Bereskin & Parr LLP S.E.N.C.R.L., s.r.l.

(57) ABSTRACT

Embodiments of the invention may provide a computing platform, a business rules engine, a method, a system, and a user interface for building a computing platform, where each is based on a hierarchy of nested data structures and an application programming interface defining functions. The functions comprise at least one function for nesting one or more data structures within the contents of an enclosing data structures such that nesting the one or more data structures within the contents of the enclosing data structures results in a hierarchy of nested data structures; at least one function for removing one or more data structures from the contents of the enclosing data structures; at least one function for retrieving one or more data structures from the contents of the enclosing data structures; and at least one function for modifying the contents of one or more data structures. Each of the functions may receive a data structures as a parameter. The functions for retrieving and removing receive a pattern as the parameter, the pattern having a head concept and nested concepts. The functions match the contents of the data structures against the pattern in a recursive manner, wherein the matching is first by the head concept and then by the zero or more nested concepts.

42 Claims, 11 Drawing Sheets

U.S. PATENT DOCUMENTS

| | | | |
|---|---|---|---|
| 6,584,464 B1 | 6/2003 | Warthen | |
| 6,751,619 B1 | 6/2004 | Rowstron et al. | |
| 7,027,055 B2 | 4/2006 | Anderson et al. | |
| 7,120,896 B2 | 10/2006 | Budhiraja et al. | |
| 7,236,940 B2 | 6/2007 | Chappel | |
| 7,266,535 B1 | 9/2007 | Nelken et al. | |
| 2001/0051937 A1 | 12/2001 | Ross et al. | |
| 2002/0085020 A1* | 7/2002 | Carroll, Jr. | 345/700 |
| 2002/0147611 A1 | 10/2002 | Greene et al. | |
| 2002/0165727 A1 | 11/2002 | Greene et al. | |
| 2002/0165745 A1 | 11/2002 | Greene et al. | |
| 2003/0084010 A1 | 5/2003 | Bigus et al. | |
| 2003/0126136 A1 | 7/2003 | Omoigui | |
| 2003/0184585 A1* | 10/2003 | Lin et al. | 345/763 |
| 2003/0191608 A1 | 10/2003 | Anderson et al. | |
| 2004/0017403 A1 | 1/2004 | Andersson et al. | |
| 2004/0034795 A1 | 2/2004 | Anderson et al. | |
| 2004/0036721 A1 | 2/2004 | Anderson et al. | |
| 2004/0059436 A1 | 3/2004 | Anderson et al. | |
| 2004/0059705 A1 | 3/2004 | Wittke et al. | |
| 2004/0107414 A1 | 6/2004 | Bronicki et al. | |
| 2004/0119752 A1 | 6/2004 | Beringer et al. | |
| 2005/0054381 A1 | 3/2005 | Lee et al. | |
| 2005/0091185 A1 | 4/2005 | Koutyrine et al. | |
| 2005/0118996 A1 | 6/2005 | Lee et al. | |
| 2005/0144218 A1 | 6/2005 | Heintz | |
| 2005/0246301 A1 | 11/2005 | Lin et al. | |
| 2006/0149582 A1 | 7/2006 | Hawkins | |
| 2006/0242256 A1 | 10/2006 | Gray et al. | |
| 2007/0038610 A1 | 2/2007 | Omoigui | |
| 2007/0203867 A1 | 8/2007 | Hogue et al. | |

FOREIGN PATENT DOCUMENTS

| | | | |
|---|---|---|---|
| WO | 0038136 | A1 | 6/2000 |
| WO | 0038137 | A1 | 6/2000 |
| WO | 0038142 | A1 | 6/2000 |
| WO | 0038143 | A1 | 6/2000 |
| WO | 0108051 | A1 | 2/2001 |
| WO | 0109831 | A2 | 2/2001 |
| WO | 0217106 | A1 | 2/2002 |
| WO | 02088988 | A1 | 11/2002 |
| WO | 03009082 | A2 | 1/2003 |
| WO | 03038548 | A2 | 5/2003 |
| WO | 2004109503 | A2 | 12/2004 |
| WO | 2004109509 | A1 | 12/2004 |
| WO | 2006042841 | A2 | 4/2006 |
| WO | 2007012499 | A2 | 2/2007 |

OTHER PUBLICATIONS

Chamberlin et al., XQuery Update Facility 1.0, Aug. 28, 2007.*

Pal et al., XQuery Implementation in a Relational Database System, 2005.*

Khushraj, D. et al.: "sTuples: Semantic Tuple Spaces", Proceedings of the First Annual International Conference on Mobile and Ubiquitous Systems: Networking and Services (MobiQuitos'04), Aug. 2004.

Mostinckx, S. et al.: "Fact Spaces: Coordination in the Face of Disconnection".

Voerman, M.: "Adobe JamJar: Using Flex 2 to Build a Collaborative Environment Application", Adobe Systems Incorporated, Technical Paper. Available online: http://labs.adobe.com/technologies/jamjar.

Astesiano, E. et al.: "UML-SPACES: A UML Profile for Distributed Systems Coordinated Via Tuple Spaces".

Curino, C. et al.: "TinyLIME: Bridging Mobile and Sensor Networks through Middleware", Proceedings of the 3rd IEEE International Conference on Pervasive Computing and Communications (PerCom 2005).

Ciancarini, P.: "PoliS: a Programming Model for Multiple Tuple Spaces", 1991, p. 44-51.

Lee, H.S. et al.: "Dynamic Augmentation of Generalized Rete Networks for Demand-Driven Matching and Rule Updating", 1990, p. 123-129.

Schrock, JR et al.: "Object Oriented National Language Support for Format and Pattern Matching Programming Tools", IBM Technical Disclosure Bulletin, Apr. 1, 1992, vol. 34, No. 11.

Nasution, B.B. et al.: "A Hierarchical Graph Neuron Scheme for Real-Time Pattern Recognition", IEEE Transactions on Neural Networks, vol. 19, No. 2, Feb. 2008, p. 212-229.

Carlis, JV et al.: "Conceptual Data Model for Storage of Composite Production Rules", IBM Technical Disclosure Bulletin, Sep. 1, 1993, vol. 36, No. 9A, p. 317-326.

Hollander, CR et al.: "Method for Semantically Resolving Attribute Constraint Specifications in Frame Structured Knowledge Bases", IBM Technical Disclosure Bulletin, Jun. 1, 1981.

Brajnik, G. et al.: "User Modeling in Expert Man-Machine Interfaces: A Case Study in Intelligent Information Retrieval", IEEE Transactions on Systems, Man and Cybernetics. vol. 20, No. 1, Jan./Feb. 1990, p. 166-185.

* cited by examiner

COMPUTING PLATFORM BASED ON A HIERARCHY OF NESTED DATA STRUCTURES

FIELD

The described embodiments relate to a computing platform, rules engine, user interface, system and method based on a hierarchy of nested data structures, and in particular, to an application programming interface for use in generating a hierarchy of nested data structures, the contents of which may be matched against a pattern in a recursive manner by concept.

BACKGROUND

A tuple space is a repository of tuples designed to support the associative memory paradigm commonly referred to as the Blackboard Metaphor. A tuple space coordinates producers and consumers via a publish and subscribe mechanism—producers publish entries to a tuple space and consumers receive notifications of tuples matching their subscription. Implementations generally support a query by template mechanism which supports matching of entries in a space against subscriptions by concept. Tuple space query languages have been developed to support more sophisticated matching of entries against subscriptions.

A business rules engine 76 is a matching system that finds combinations of facts in working memory that satisfy conditions within rules. A business rules engine 76 is generally composed of a rule base or rule repository for storing rules and a working memory for storing facts, and for storing partial matches of facts against rules. A commercial business rules engine will frequently support the definition of 'domain specific languages' which allow business experts to configure and manage rules.

An expression language is the common term for a programming or scripting language within which expressions may be composed and evaluated within some context. Expression languages (EL) commonly have an evaluation function of the form <Expression>.evaluate(<context>), where <Expression> is an object representation of an Expression and where <context> is an object representation of a container within which the expression will look for and manipulate variable bindings.

SUMMARY

In a first aspect, some embodiments of the invention provide a computing platform configured as a hierarchy of nested data structures, the computing platform comprising a processor and memory storing instructions, the instructions being executable to configure the processor to provide: an application programming interface for a data structure, wherein each data structure comprises contents. The data structure is selected from the group consisting of: a tuple space, an object, and an atomic data type. The application programming interface defines: at least one function for nesting one or more data structures within the contents of an enclosing data structure such that nesting the data structures within the contents of the enclosing data structure results in a hierarchy of nested data structures; at least one function for removing one or more data structures from the contents of the enclosing data structure; at least one function for retrieving one or more data structures from the contents of the enclosing data structure; and at least one function for modifying the contents of one or more data structures; wherein each of the plurality functions receives one or more data structures as a parameter; wherein the function for removing and the function for retrieving receives as the parameter a pattern defining a template for one or more data structures of interest, the pattern having a head concept and zero or more nested concepts, wherein the concept is an ordered list of elements identifying a concept name and structure; and wherein the function for removing and the function for retrieving matches the contents of the enclosing data structure against the pattern in a recursive manner, matching first by the head concept and then by the zero or more nested concepts.

The computing platform of claim 1, wherein the function for removing and the function for retrieving are operable to return a hierarchy of nested data structures from the contents of the enclosing data structure, and wherein the returned hierarchy of nested data structures can be queried using the functions defined by the application programming interface.

In another aspect, some embodiments of the invention provide a business rules engine 76 comprising: a working memory, wherein the working memory is implemented as a hierarchy of nested data structures; a processor configured to interface with the application programming interface; a rulebase comprising a plurality of rules, wherein each rule is a data structure and comprises: a nested data structure for storing the antecedent conditions of the rule; a nested data structure for storing the consequent actions of the rule; and a nested data structure for storing the state of a matching algorithm; wherein, in operation, facts can be asserted into the working memory, wherein each fact is a data structure; and wherein, in operation, the plurality of rules operate on the facts in the working memory to generation one or more productions.

In another aspect, some embodiments of the invention provide a user interface for building a computing platform based on a hierarchy of nested data structures. In another aspect, some embodiments of the invention provide a method for building a computing platform based on a hierarchy of nested data structures comprising: defining an application programming interface for a data structures by defining the plurality of functions as described herein; nesting one or more data structures within the contents of an enclosing data structure using the application programming interface in order to generate a hierarchy of nested data structures; and matching the contents of the hierarchy of nested data structures against a pattern in a recursive manner, wherein the matching is first by the head concept and then by the one or more nested concepts, wherein each concept is a template for a data structures.

In another aspect, some embodiments of the invention provide a system for building a computing platform based on a hierarchy of nested data structures comprising at least one machine for: defining an application programming interface for a tuple space by defining the plurality of functions as described herein; nesting one or more data structures within the contents of an enclosing tuple space using the application programming interface in order to generate a hierarchy of nested data structures; and matching the contents of the hierarchy of nested data structures against a pattern in a recursive manner, wherein the matching is first by the head concept and then by the one or more nested concepts, wherein each concept is a template for a data structure.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

DESCRIPTION OF EXEMPLARY EMBODIMENTS

Figure 1:
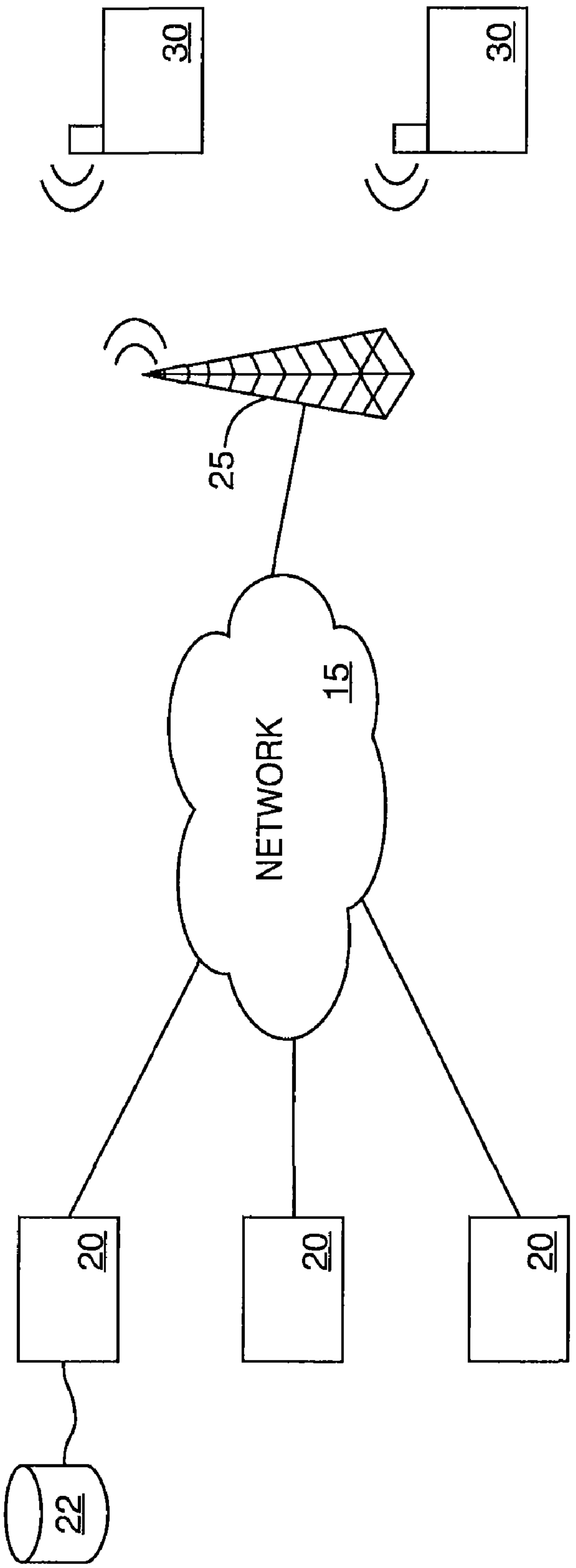
FIG. 1 is a block diagram illustrating the components of a system for building a computing platform based on a hierarchy of nested data structures according to an embodiment of the present invention.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing example implementations.

Embodiments of the systems and methods described herein may be implemented in hardware or software, or a combination of both. For example, these embodiments may be implemented in computer programs executing on programmable computers each comprising at least one processor, a data storage system (including volatile and non-volatile memory and/or storage elements), at least one input device, and at least one output device. For example and without limitation, the programmable computers may be a mainframe computer, server, personal computer, laptop, personal data assistant, or cellular telephone. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the method steps described herein. The inventive system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a non-transitory computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Reference is first made to FIG. 1, which shows a block diagram illustrating the components of a system 10 for building a computing platform based on a hierarchy of nested data structures. The system 10 may include wired devices 20 and wireless devices 30 connected via a network 15 and communication means 25. The computing platform may reside on one wired device 20 and/or wireless device 30, or multiple wired devices 20 and/or wireless devices 30 distributed over a wide geographic area and connected via e.g. network 15.

Wired devices 20 and wireless devices 30 may be any networked computing device including a processor and memory, such as a personal computer, workstation, server, portable computer, mobile phone, personal digital assistant, laptop, smart phone, satellite phone, WAP phone, embedded device or system or a combination of these. Wired devices 20 and wireless devices 30 may include a software application, application plug-in (e.g. a widget), instant messaging application, mobile device application, e-mail application, online telephony application, java application, web page, or web object (e.g. a widget) residing or rendered on wired devices 20 and wireless devices 30 in order to access the computing platform directly or via network 15. Wired devices 20 and wireless devices 30 will be described in more detail herein in relation to FIG. 2.

Network 15 may be any network capable of carrying data and communicating with wired devices 20 and/or wireless devices 30, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-F1, WiMAX), SS7 signaling network, fixed line, local area network, wide area network, and others, including any combination of these. Network 15 is any network capable of interfacing with, and enabling communication between wired devices 20 and/or wireless devices 30. For example, network 15 may include a mobile network implemented using various mobile communication standards such as for example GSM or CDMA and may be integrated with other networks employing various protocols such as a public switch telephone network (PSTN).

Communication means 25 allows for wireless communication between network 15 and wireless devices 30, such as a wireless transceiver or tower for example. While only one network 15 and communication means 25 is shown, multiple networks 15 and communication means 25 may be distributed over a geographical area in order to enable communication between wired devices 20 and/or wireless devices 30.

Wired devices 20 and/or wireless devices 30 may be connected to a persistent store 22 for providing a means for persisting the configuration of a hierarchy of nested tuple spaces. As an illustrative example, only one persistent store 22 is shown connected to a wired device 20, however, system may include multiple persistent stores connected to multiple devices. The persistent store 22 may be implemented using a server system comprising one or more servers with computing processing abilities and memory such as database(s) or file system(s). For example, this may include a mail server, web server and database server.

Figure 2:
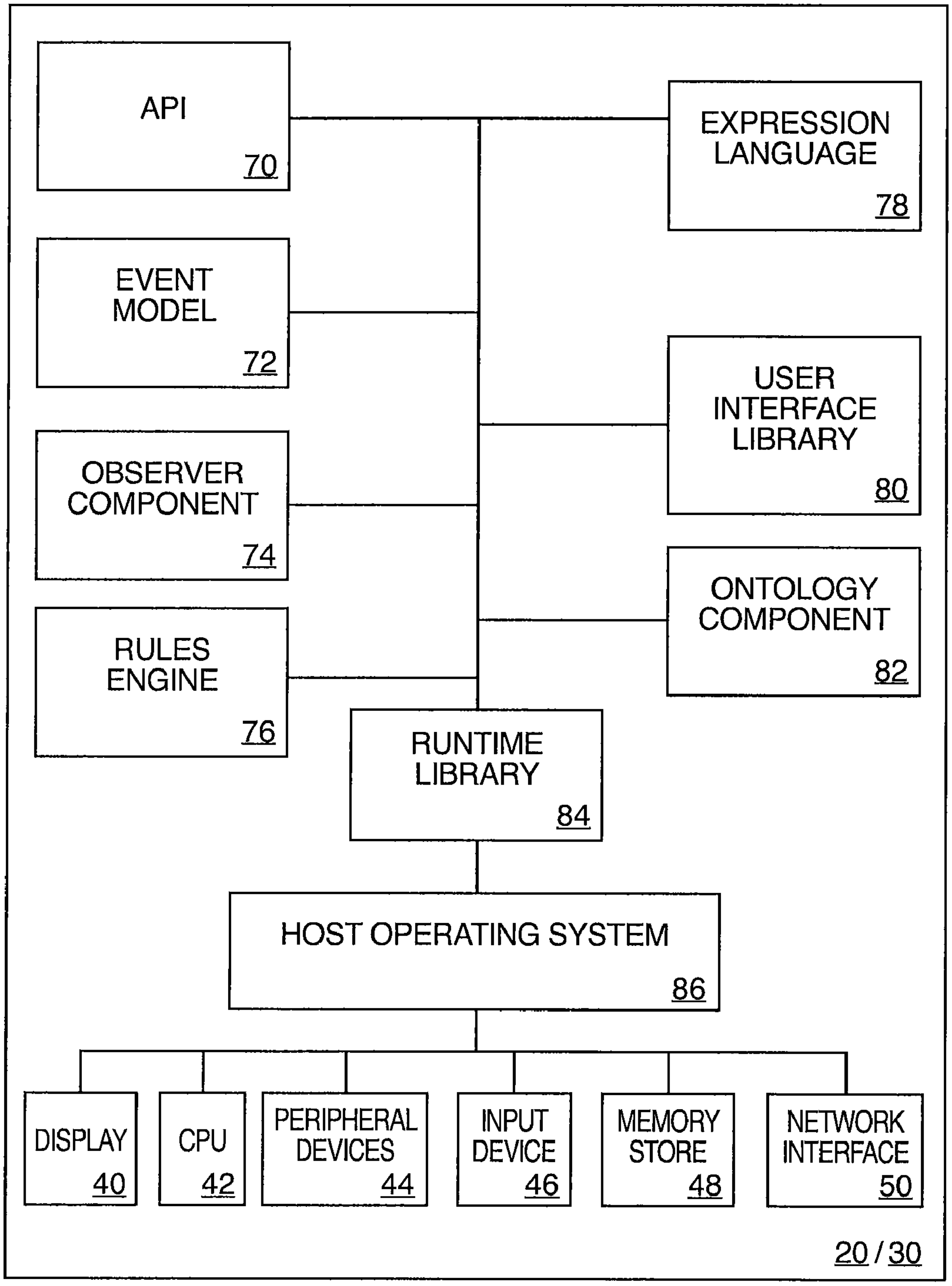
FIG. 2 is a block diagram illustrating the components of a wired and/or wireless device in further detail.

Reference is now made to FIG. 2, which shows a block diagram illustrating the components of a wired and/or wireless device 20/30 in further detail.

In an exemplary embodiment, wired devices 20 and/or wireless devices 30 have associated with them a display 40, an input device 46, a memory store 48, a central processing unit 42, a network interface 50, and one or more optional peripheral devices 44. The input devices 46 may be any device that allows for input, examples of which may include, but are not limited to, keyboards, microphones, speakers, and pointing devices. The memory store 48 is a permanent storage associated with the device 20/30. In one embodiment, the memory store 36 may store an instance of the computing platform or a portion thereof, and may also provide a means for persisting the configuration of the hierarchy of nested tuple spaces. The central processing unit 42 is used to execute instructions for operation of wired devices 20 and/or wireless devices 30, and may exist as a configuration of multiple CPU's. The network interface 50 may be a wired and/or wireless network interface that allows the device to connect to the network 15. The peripheral devices 44 may include but are not limited to, devices such as printers, antenna, transceivers and scanners.

The wired devices 20 and/or wireless devices 30 are configured to provide a core library with an application programming interface 70, event model 72, observer component 74, rules engine 76, expression language 78, user interface 80, and ontology component 82 representing concepts. The wired devices 20 and/or wireless devices 30 are further configured with a runtime library 84 implementing the application programming interface 70 on the host operating system 86 to interact with the memory store 48, the central processing unit 42, etc. An executable image links the core library, user interface library 70, and runtime library into an executable format suitable for the host operating system 86. The instructions of the executable are configured to examine the wired devices 20 and/or wireless devices 30 for configuration resources which may define concepts recognizable to the core library and/or user interface 80, and which may include the persistent state of a working hierarchy of nested data structures retained from a previous session.

A user may access the core library by providing the components on the wired devices 20 and/or wireless devices 30, or by providing access to the components on a remote server via network. On start up, the components of the core library (the application programming interface 70, event model 72, observer component 74, rules engine 76, expression language 78, user interface 80, and ontology component 82) are loaded into memory 48.

The user interface 80 provides a visualization of the hierarchy of data structures on the display 40. The display 40 is a monitor type device that is used to display information such as a graphical user interface. The user interface 80 may be configured to provide a display adapter, user interface adapter library, resource adapter to interact with the memory store 48 and central processing unit 42, and a registry of view definitions for rendering patterns and concepts. The registry may be configured as a data structure, such as a tuple space. The user interface 80 will track changes to the underlying hierarchy of data structures using the event model 72. The user interface 80 representation of the hierarchy of spaces may include representations of forms, links, menus, images, videos, sound clips, rules, and other concepts from business domains of interest to the user.

As the user interacts with the user interface 80 it operates to configure the underlying hierarchy of data structures in memory 48. This in combination with the ontology component 82, event model 72, observer component 74, expression language 78 and rules engine 76 may have the effect of causing the user interface 80 component to add, remove, or modify user interface representations of the hierarchy.

Figure 3:
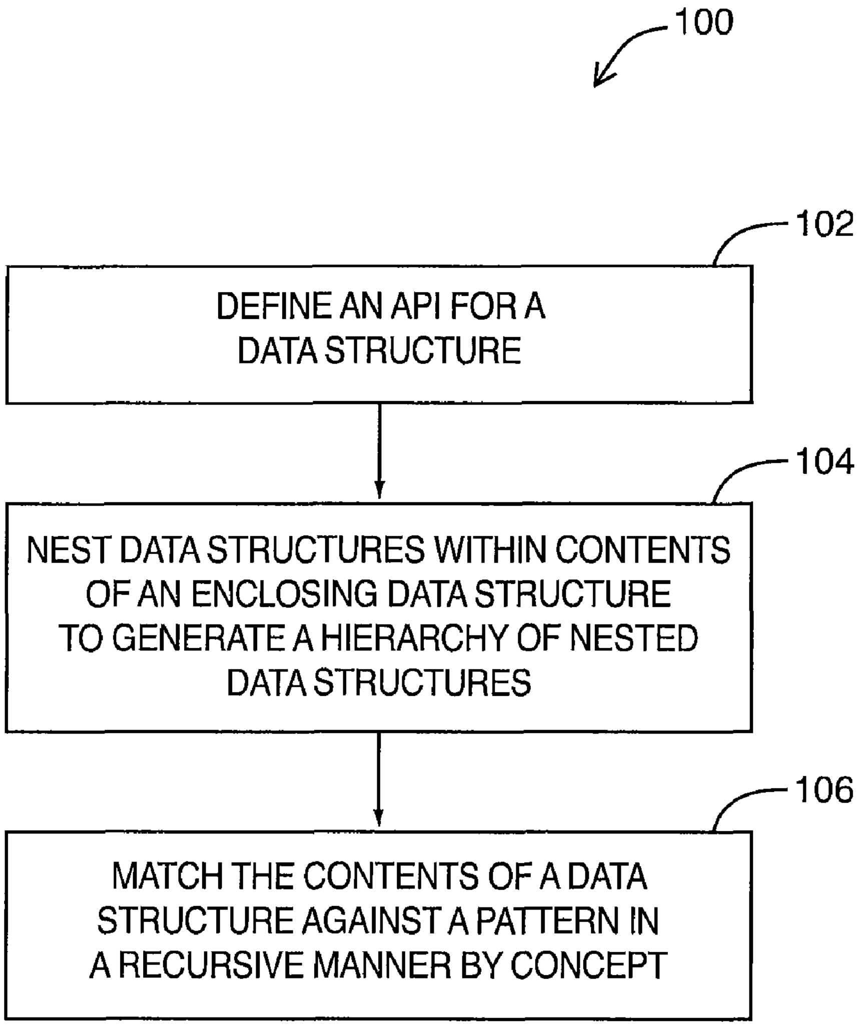
FIG. 3 is a flow diagram of a method for building a computing platform based on a hierarchy of nested data structures according to an embodiment of the present invention.

Reference is now made to FIG. 3, which illustrates a flow diagram of a method for building a computing platform based on a hierarchy of nested data structures.

At step 102, system 10 defines an application programming interface for a data structure. Generally, an application programming interface is a set of functions, routines, data structures, classes and/or protocols provided by one or more libraries in order to support the building of applications. The application programming interface for a data structure may define the following functions: (a) one or more functions for nesting one or more data structure within the contents of an enclosing data structure; (b) one or more functions for removing one or more data structure from the contents of an enclosing data structure; (c) one or more functions for retrieving one or more data structure from the contents of an enclosing data structure; and (d) one or more functions for modifying the contents of one or more data structure.

By way of illustrative example, the application programming interface for a data structure may define the functions as:

Space get (Space pattern)
Space take (Space pattern)
Space put (Space pattern)
Space modify (Space pattern)

Each function of the application programming interface receives a parameter. The parameter is a pattern that defines a head concept, and in some instances, nested concepts. A concept is a tuple or ordered list of elements in which the first element identifies a concept name and subsequent elements represent the body structure of the concept. The ontology component 82 defines the relationships between concepts. For example, the ontology component 82 may define a link between two concepts such that concept A "is-a" concept B. The link would define the concept membership set of concept A to include the concept membership set of concept B. The ontology component 82 is a common repository shared by the resources on the device 20/30.

The hierarchy is built of data structures such as tuple spaces, objects, atomic data types and the like. The data structure is conceptually a collection or container for other spaces that the system 10 may interact with using the application programming interface. The system 10 may query and manipulate the contents of the data structure using the application programming interface.

For illustrative purposes, the data structure will be described herein as a tuple space. The system 10 may query and manipulate the contents of the tuple space using the application programming interface based on the query by template mechanism supported by tuple spaces. The system 10 may implement the data structure natively as a tuple space, or it may be an object or atomic data type that is mapped to the application programming interface of a tuple space. For example, the system 10 can map object to the application programming interface of a tuple space by using the object attributes as concepts or patterns associated with tuple spaces. For example, the system 10 can map an atomic data type to the application programming interface of a tuple space by using an abstract representation of the atomic data type as the concepts or patterns associated with tuple spaces.

Figure 5:
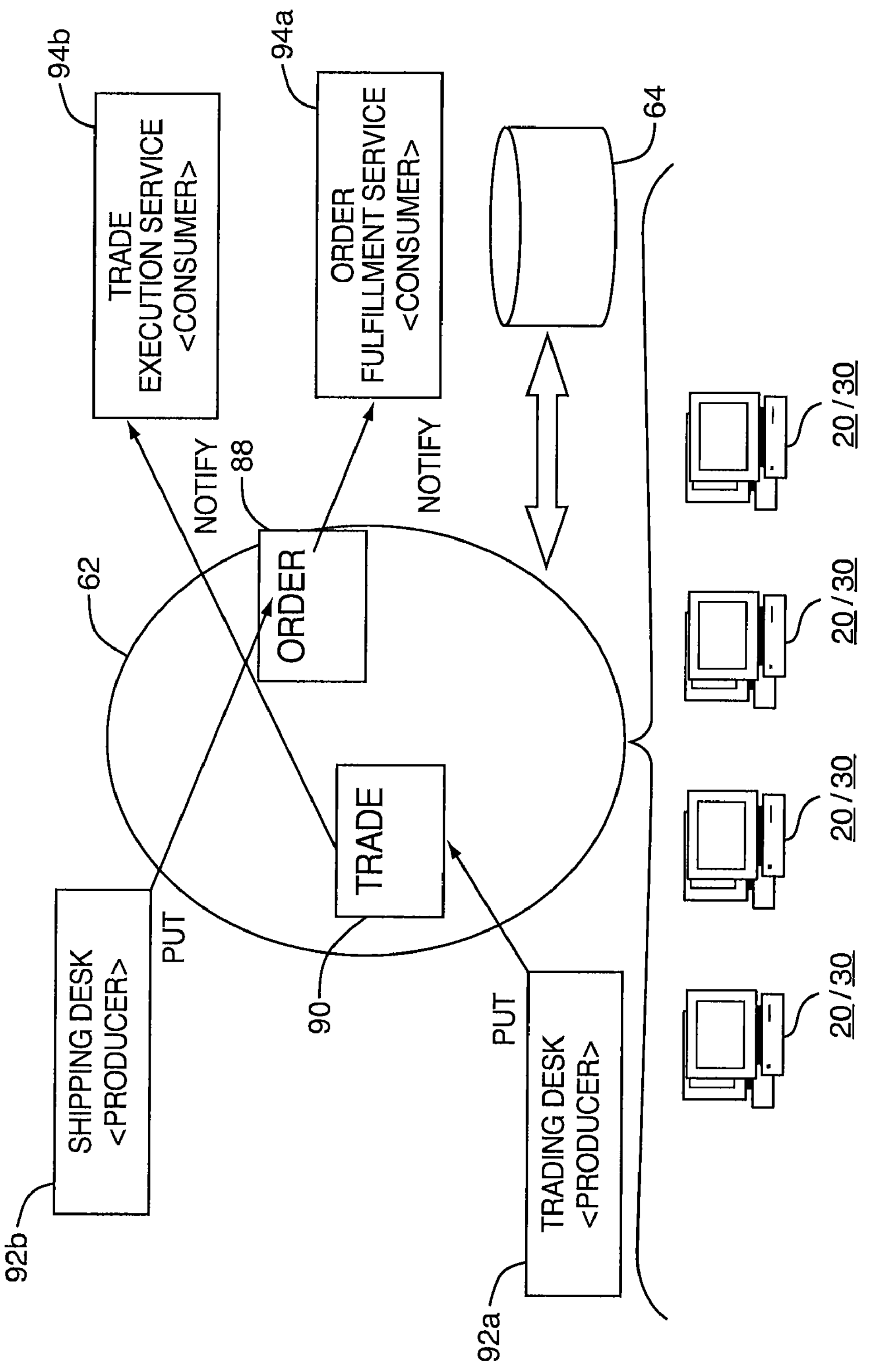
FIG. 5 is a block diagram illustrating the components of a tuple space.

By way of background, reference is now made to FIG. 5, which shows a block diagram illustrating the components of an example tuple space 62. As noted above, tuple spaces are generally designed to coordinate producers 92*a*, 92*b* and consumers 94*a*, 94*b* using a publish/subscribe model in which producers and consumers interact using data structures which represent concepts within an Ontology commonly understood by the interacting parties.

Producers 92*a*, 92*b* interact with a tuple space 62 by putting tuples 88, 90 therein using the functions of an application programming interface. For example, a trading desk producer 92*a* may put a trade tuple 90 in the tuple space 62 and a shipping desk producer 92*b* may put an order tuple 88 in the tuple space 62.

Consumers 94*a*, 94*b* interact with the tuple space 62 by querying the tuple space 62 or by subscribing on the tuple space 62 for notifications of tuples matching a specific pattern. For example, an order fulfillment service consumer 94*a* subscribes for notifications of order tuples 88 matching a specific pattern and a trade execution service consumer 94*b* subscribes for notifications of trade tuples 90 matching a specific pattern.

The tuple space 62 functions as middleware by matching the tuples 88, 90 put into the tuple space 62 by producers 92*a*, 92*b* against the specific patterns of tuples 88, 90 subscribed by consumers 94*a*, 94*b*.

Tuple space implementations generally support matching by concept and super-concept. For example, a concept for a tuple may be 'employee' and a super-concept may be 'person', where an employee is defined to be a type of person. Consumers subscribing for notifications of new person tuples put into a tuple space will be notified of new employee tuples.

Tuple space implementations generally support queries and notifications using templates which describe a single concept. Referring to the above example, an order fulfillment service consumer 94*a* only receives notifications of order tuples 88 and a trade execution service consumer 94*b* only receives notifications of trade tuples 90. Tuple Space implementations do not typically support a consumer subscribing for notifications of trade tuples 90 and order tuples 88 that are related by an attribute as each tuple 88, 90 is of a different concept. As will be explained herein, embodiments of the present invention support correlation of spaces describing multiple concepts.

Referring back to FIG. 3, at step 104, system 10 nests one or more tuple spaces within the contents of an enclosing tuple space using the application programming interface in order to generate a hierarchy of nested tuple spaces.

Figure 4:
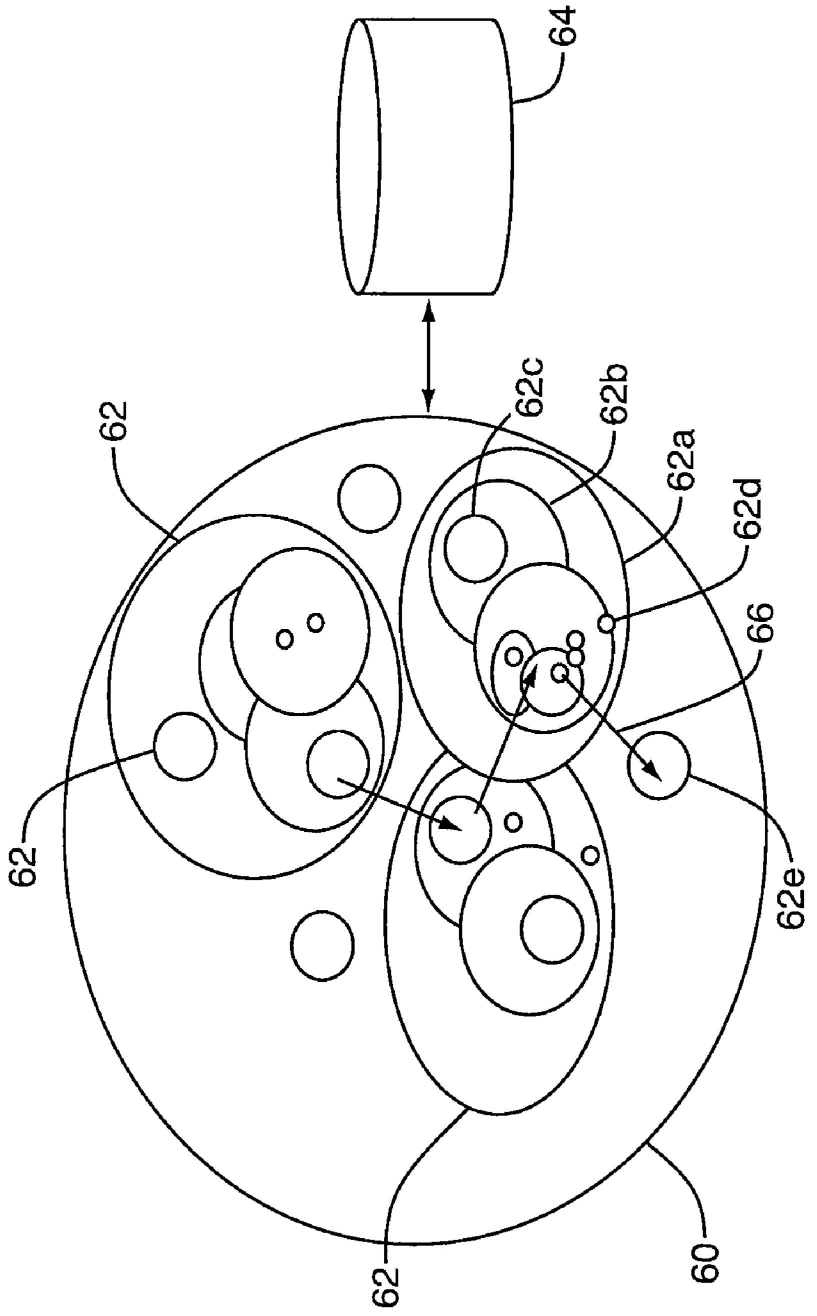
FIG. 4 is a block diagram illustrating a hierarchy of nested data structures according to an embodiment of the present invention.

Reference is now made to FIG. 4, which shows a block diagram illustrating an example hierarchy of nested tuple spaces according to an embodiment of the present invention.

An enclosing tuple space 60 forms part of the hierarchy of nested tuple spaces and provides a container for the nested tuple spaces 62*a*, 62*b*, 62*c*, 62*d* and 62*e*. The contents of the enclosing tuple space 60 may provide additional hierarchies of nested tuple spaces. For example, an enclosing tuple space 62*a* provides a container for nested tuples spaces 62*b*, 62*c*, 62*d*. The persistent store 64 provides a means for persisting the configuration of the hierarchy of nested tuple spaces. The arrows 66 illustrate inter-space interactions. This may have the effect of forwarding notifications between spaces. For example, system 10 may provide for inter-space interactions by nesting one or more observers into an enclosing space. As another example, system 10 may nest rules into an enclosing space. Observers and rules are tuple spaces and manipulated using the application programming interface. System 10 uses rules and observers to cause movement of facts and tuple spaces from one space into another.

At step 106, system 10 interacts with the hierarchy of nested tuple spaces and matches the contents of the hierarchy against a pattern in a recursive manner. The matching is first by the head concept and then by the plurality of nested concepts, where, as noted above, each concept is a template for a tuple space. System 10 may repeat step 106 multiple times in order to interact with the hierarchy by calling the functions of the application programming interface.

Figure 6:
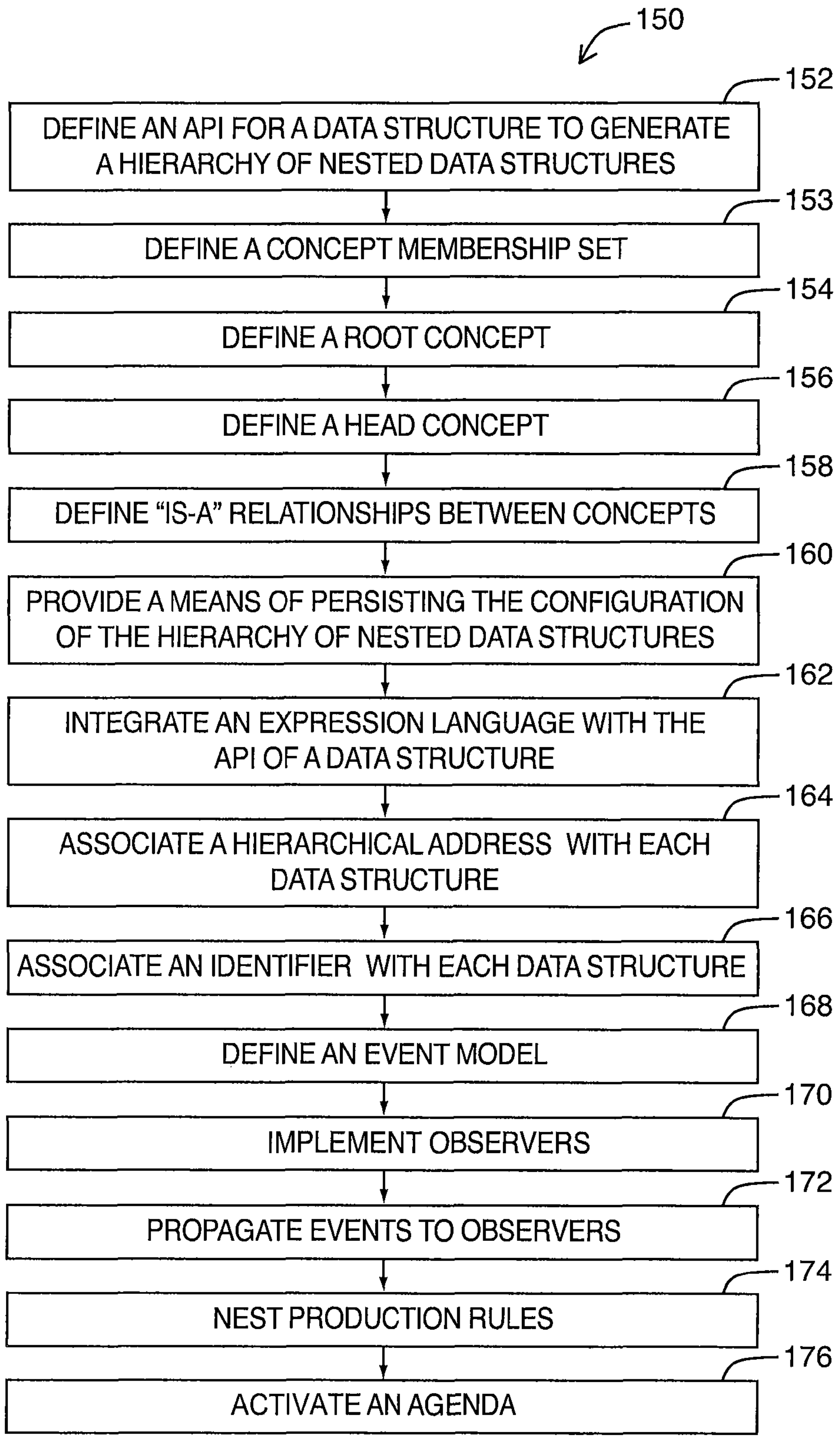
FIG. 6 is a flow diagram of a method for building a computing platform according to another embodiment of the present invention.

Reference is now made to FIG. 6, which is a flow diagram of another method for building a computing platform based on a hierarchy of nested tuple spaces according to embodiments of the present invention At step 152, system 10 defines an application programming interface for a tuple space, as explained above in relation to FIG. 3 at step 102. The application programming interface may include a wide range of functions and may be implemented with a programming language. System 10 uses the application programming interface to generate and interact with a hierarchy of nested tuple spaces.

The application programming interface defines a 'space' as a universal data model to provide a container or memory store for a configuration of the hierarchy of nested tuple spaces. Embodiments of the present invention do not distinguish between the class or implementation of the container (a tuple space) containing the hierarchy of nested tuple spaces and entries (tuple spaces) within the container. The container and entries within the container are both of the root concept "space", as will be explained.

At steps 153 to 158, system 10 configures the ontology component 82. As noted above, the tuple space data structure supports a query by template algorithm, in which tuples in a space are matched against a pattern or template first by head concept and then by nested concepts. System 10 configures an ontology component 82 to define a common representation of concepts and relationships between concepts to facilitate the pattern matching. There are several ways to implement the ontology component 82 common to system 10, as will be explained herein. In order to implement the ontology component 82, system 10 will associate the pattern defined by the data structures or tuple spaces of the system 10 with one or more concepts (e.g. a tuple or ordered list of elements or a Class within an object oriented implementation language).

At step 153, system 10 defines a concept membership set for each tuple space in the hierarchy of nested tuple spaces. A concept membership set is a tuple or ordered list of elements consisting of the concepts that the tuple space is a member of.

The concept membership set of a given space may comprise a plurality of concepts as will be explained in relation to steps 154 and 156.

At step 154, system 10 defines a root concept for each tuple space, where the root concept is the most generalized (i.e. least specialized) concept of the concept membership set. In accordance with embodiments of the present invention, the root concept for a tuple space is “tuple space” or more generally “space”. System 10 uses the query by template mechanism common to tuple spaces to query an arbitrary space over its entire contents by providing the pattern ‘space’ to a function of the application programming interface. That is, system 10 may query a tuple space for its entire contents by providing the pattern for the root concept “tuple space” as a function parameter (getMultiple ( ) for example).

At step 156, system 10 defines a head concept for each tuple space, where the head concept is the most specialized concept of the concept membership set for the tuple space. The head concept and the root concept form part of the concept membership set for each tuple space. In some instances, the head concept and the root concept may both be ‘space’ and the concept membership set for the tuple space will be {‘space’}.

By way of illustrative example, a space may consist of the single character ‘1’ which has the head concept ‘1’, the root concept ‘space’, and the concept membership set {‘1’, ‘integer’, ‘number’, ‘space’}. Similarly, a space consisting of the character sequence ‘1/2’ has the head concept ‘1/2’, the root concept ‘space’, and the concept membership set {1/2', ‘rational number’, ‘number’, ‘space’}. A space consisting of the character sequence “I love new york” is associated with the concept membership set {“I love new york”, ‘string’, ‘space’}.

A space may be comprised of a sequence of other spaces or complex spaces. For example, a space may include a sequence of nested spaces to define a date of birth. A date of birth includes a day space, a month space, and a year space. A date of birth has the head concept ‘dob’ and the concept membership set {‘dob’, ‘date’, ‘space’}.

In XML format a space having the concept ‘date of birth’ may have the following representation:

```
<dob>
    <day>22</day>
    <month>2</month>
    <year>1970</year>
</dob>
```

System 10 may reference concepts by name, such as ‘identifier’, ‘day’, ‘month’, and ‘year’, for example, with namespace prefixes in order to differentiate similarly named concepts in multiple domains. Using namespace prefixes provides system 10 with ability to differentiate between similarly named concepts in different domains.

Concepts may be organized or grouped into various vocabularies, such that each vocabulary contains one or more concepts. A namespace may be used to reference a vocabulary of concepts. System 10 may use a namespace as a means of differentiating similarly named concepts from distinct vocabularies.

The system 10 may implement the ontology implicitly by assigning the patterns or templates defined by each data structure or tuple space to a concept membership set which includes the head concept of the pattern and the concept ‘space’ (i.e. the broadest concept of system 10). This method does not require a centralized agreement of the common ontology between the components of system 10. However, the matching of tuples within spaces may be limited to the head concept of the pattern or the root concept ‘space’.

The system 10 may implement the ontology component 82 explicitly and declaratively by configuring an ontology registry that defines “is-a” and “has-a” relationships between concepts of interest to system 10. Referring back to FIG. 6, at step 158, system 10 configures the ontology registry by defining the “is-a” relationships between concepts within the ontology component 82, which supports the definition of superclass/subclass relationships between concepts and provides a mechanism to define concepts and relationships among concepts. This approach is similar to that taken by object oriented frameworks in which the ontology component 82 is statically defined in the form of precompiled classes. The system 10 may further configure the ontology registry to define “has-a” relationships between concepts.

As another approach, the system 10 may implement the ontology component 82 by inferring is-a relationships between concepts dynamically by matching patterns against templates of concepts in an ontology registry. For example to determine if a pattern matches a ‘person’ concept, the system would lookup the ‘person’ concept in the ontology registry and match the ‘person’ concept against the pattern of interest. This approach is similar to that used in Semantic Web technologies in which is-a relationships are inferred via production rules.

Figure 7:
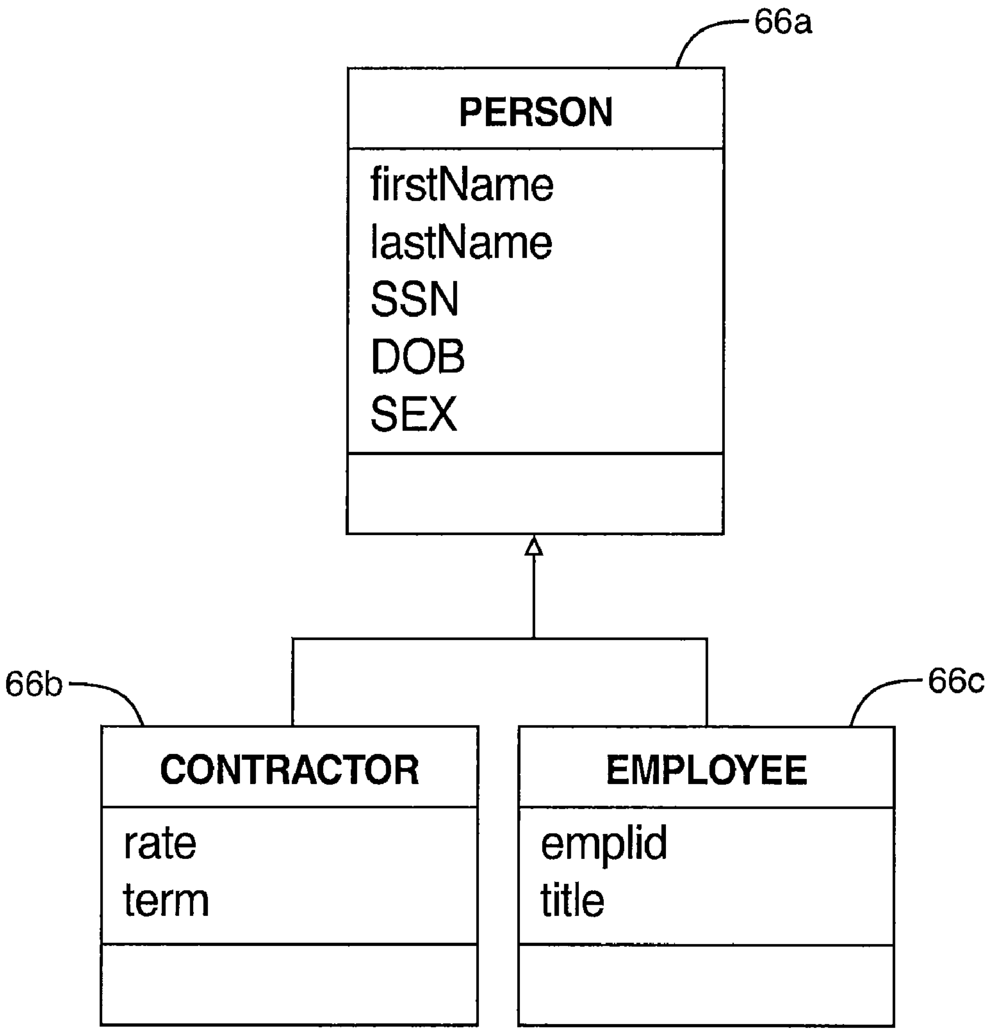
FIG. 7 is a block diagram illustrating an example Unified Modeling Language representation of an ontology component.

Referring now to FIG. 7, there is shown a block diagram illustrating a portion of an ontology component 82 defining the structure of concepts and relationships between concepts within a domain of discourse. In this example, the ontology component 82 defines a person concept 66*a* which includes first name, last name, SSN, date of birth, and a sex, each being a space representative of a concept. The configuration for the space 66*a* is maintained within the ontology component 82 as a hierarchy of nested tuple spaces. Similarly, contractor concept 66*b* defines rate and term nested concepts, and is declared to be a (“is-a”) person by virtue of the UML generalization relationship between components 66*b* and 66*a* in the diagram. Similarly, an employee concept 66*c* defines an emplid and title space, which is also declared to be a (“is-a”) person by virtue of the UMI generalization relationship between concepts 66*c* and 66*a*. Within this ontology component 82 the concept membership set for a contractor concept 66*b* would be reported as {‘contractor’, ‘person’, ‘space’} by an application programming interface designed to compute the concept membership set; similarly the concept membership set of an employee concept 66*c* would be reported as {‘employee’, ‘person’, ‘space’} by an application programming interface designed to compute concept membership set.

The system 10 may include instructions in memory to configure the processor to provide an application programming interface for the ontology component 82 to include one or more function for computing and returning the concept membership set of a specific tuple space. The application programming interface may further include functions for determining and returning the head concept and the root concept of a specific tuple space. The concept membership set, the root concept and the head concept returned by the functions are each a tuple space.

For example:

Space getHead( )—returns the most specialized concept of the space

Space getMembership( )—returns an ordered set of all concepts of which the space is a member (i.e. the concept membership set).

Referring back to FIG. 6, at step 160, system 10 provides a means of persisting the configuration of the hierarchy of nested tuple spaces (e.g. persistent means 64 or 22).

The application programming interface may include a function for serializing the hierarchy of nested tuple spaces to an intermediate form and from the intermediate form while preserving the configuration the tuple space. This intermediate form may be XML or some other representation.

The application programming interface may include a function for transforming an object form of the hierarchy of nested tuple spaces into a secondary representation (e.g., XML) suitable for transmission over a network and a function for transmitting the secondary representation over a network. The secondary representation may also be suitable for storage. The application programming interface may further include a function for creating a copy of the hierarchy of nested tuple spaces.

When reconstituted from a secondary representation the configuration will be fully intact including all content and behavior. The configuration may include the partial state of the network implementing the match algorithm for any production rules which may be present in any hierarchically nested space within the space that was serialized.

System 10 takes advantage of the data model 'tuple space' so that an algorithm can transform the object form of a hierarchy of spaces into a 2D representation. A complementary algorithm can transform the 2D representation back into the object form. XML, JSON, or Lisp/Scheme syntax may be used, for example.

Referring to FIG. 6, at step 162, system 10 integrates an expression language with the application programming interface of a tuple space in order to support more flexible queries. The expression language has an evaluation context that is a tuple space and includes functions and/or procedures, each of which are themselves tuple spaces. The expression language is for use in evaluating expressions within tuple spaces and the application programming interface provides a means for evaluating expressions within the context of a particular tuple space.

Typically, the tuple space query by template mechanism supports equality based existential qualification. The behavior of the existential qualification algorithm is outlined in the table below.

| Fact | Pattern | Result/Comments |
| --- | --- | --- |
| <Employee><br><is-a>Person,Party</is-a><br><name>Jane Doe</name><br><sex>f</sex><br><age>33</age><br><ssn>5678</ssn><br></Employee> | <Person><br><sex>m</sex><br></Person> | Match fails. The fact <Person> matches the pattern by head concept, ie an Employee is a Person, however the fact fails to match the nested tuple <sex>m</sex> within the pattern, therefore the match fails. |
| <Employee><br><is-a>Person,Party</is-a><br><name>Jane Doe</name><br><sex>f</sex><br><age>33</age><br><ssn>5678</ssn><br></Employee> | <Employee><br><age>33</age><br></ Employee > | Match succeeds. The fact matches the pattern head concept <Employee> and matches on all nested tuples of the pattern. |
| <Employee><br><is-a>Person,Party</is-a><br><name>Jane Doe</name><br><sex>f</sex><br><age>33</age><br><ssn>5678</ssn><br></Employee> | <Party><br><age/><br><sex/><br></Party> | Match succeeds. The fact matches the pattern head concept <Party> and matches on all nested tuples of the pattern, which have no associated values, and which therefore match on similar concepts having any or value. |

The following is an outline of one possible implementation of the match algorithm in accordance with embodiments of the present invention:

```
Determine if this tuple matches the specified
pattern by head concept and by the nested
contents of the pattern.
**/
boolean Space.match( Space pattern ) {
    // if this tuple is not a member of the
    // head concept of the pattern the match fails
    if ( !this.instanceOf( pattern.getHead( ) )
      return false;
    // test the nested contents of the pattern against
    // the nested contents of this tuple. If any element
    // of the pattern is not found the match fails
    for (int i=0; i < pattern.size( ); i++ ) {
        Space s = pattern.get(i);
        if ( ! this.contains(s) )
          return false;
    }
    return true;
}
/**
Determine if this tuple contains a nested tuple
matching the specified pattern. The nested tuple
must recursively match by concept and by nested
contents using the 'match' api.
**/
public boolean contains( Space pattern ) {
    for ( int i = 0; i < size( ); i++ {
        Space s = get(i);
        if ( s.match( pattern ) )
            return true;
    }
    return false;
}
```

This match algorithm supports the pattern oriented query by template functionality commonly implemented in tuple spaces, however it supports equality comparisons only. In order to provide more sophisticated matching capabilities, e.g., person tuples having age in the range 30 and 40, a more sophisticated query mechanism is implemented by system 10.

Expression languages generally have an evaluation function of the form <Expression>.evaluate(<context>), where <Expression> is an object representation of an Expression, and where <context> is an object representation of a container within which expression objects look for and manipulate variable bindings.

For example, the expression x=a+b evaluated in the context represented by the set {a=1; b=2} produces a binding for x in the modified context based on the bindings for a and b that it finds in that context. The resulting modified context becomes {x=3; a=1; b=2;}. A similar expression evaluated in the context {a=5; b=10;} produces the modified context {x=15; a=5; b=10;}.

Expression languages typically distinguish between the type or class of the expression and the type or class of the evaluation context. For example, in implementations of the JavaScript language a 'scope' object acts as a context for expression evaluation, and the two objects have disjoint type. A context is essentially a generic container with get/put/take application programming interfaces like a tuple space, whereas an expression is generally not regarded in this manner. Similarly, in implementations of the Scheme and Lisp programming languages there is a distinction between an 'Environment' or a 'Closure', which are analogous to a context in JavaScript, and between the various objects that make up the object model for expressions, including Pairs, Symbols and Atoms.

Some embodiments of the present invention treat the concept of an expression and the concept of an evaluation context as having a common superclass (i.e. both are kinds of collections that may be queried by template and share the same super class 'space' and tuple space application programming interface). In this embodiment an expression is a kind of tuple space constructed using the put/get/take application programming interface in the same manner as any other tuple space, and in this embodiment a tuple space is also the 'evaluation context' for expressions. This is convenient as expressions can participate in the query by template aspect of the tuple space, expressions can be found by template within a space, and expressions within a concept can be used as directives for the matching algorithm.

In this embodiment the Expression Language integrated with the Tuple Space uses an evaluate function of the general form Space.evaluate(Space context), which receives as parameter a space representing the evaluation context; variants of this form may include additional parameters for example to support correlation within rules. Alternate embodiments may separate the implementation of the Expression Language from that of the tuple space, however the key characteristic of the integration of the tuple space and expression language is that Expressions are kinds of Spaces which may be nested within spaces and which operate on 'context' objects which are themselves kinds of Spaces. A Function library defines various procedures for comparing and manipulating data via the tuple space application programming interface. Integration with this form of the embodiment requires changes to the 'match' algorithm as outlined below:

```
/**
Determine if this tuple matches the specified
pattern by head concept and by the nested
contents of the pattern.
**/
boolean Space.match( Space pattern ) {
    // if this tuple is not a member of the
    // head concept of the pattern the match fails
    if ( !this.instanceOf( pattern.getHead( ) )
        return false;
    // test the pattern contents against this tuple
    // if any element of the pattern is
    // not found the match fails
    for (int i=0; i < pattern.size( ); i++ ) {
        Space s = pattern.get(i);
        if ( ! this.contains(s) && s.evaluate( this) == Atom.FALSE ) {
          return false;
        }
    }
    return true;
```

If a given portion of a pattern does not have a direct counterpart in the tuple space under consideration in this embodiment then the portion of the pattern that failed to match is evaluated as an expression in the context of the tuple space under consideration. In one embodiment, if the evaluation returns a particular value (for example 'true' or 'nil') then evaluation succeeds and the nested portion of the pattern is considered to match the tuple under consideration. Other embodiments of the present invention may further direct the matching algorithm as to whether a nested Space within a pattern not contained within the enclosing Space should be treated as an expression or not; other embodiments may further direct the matching algorithm to allow or prevent a given tuple from matching on more than one corresponding tuple in the pattern, etc.

To illustrate the function of the modified match algorithm consider the following examples:

| Fact | Pattern | Result/Comments |
|---|---|---|
| <Employee><br><is-a>Person,Party</is-a><br><name>Jane Doe</name><br><sex>f</sex><br><age>33</age><br><ssn>5678</ssn><br></Employee> | <Person><br><greater><br><age>30</age><br></greater><br><less><br><age>40</age><br></less><br></Person> | Match succeeds. The fact <Person> matches the pattern at the conceptual level, and the nested expressions (> age 30) and (< age 40) succeed when evaluated in the context of the Person fact. |
| <Employee><br><is-a>Person,Party</is-a><br><name>Jane Doe</name><br><sex>f</sex><br><age>33</age><br><ssn>5678</ssn><br></Employee> | <Person><br><like><br><name>J*</name><br></like><br></Person> | Match succeeds. The fact matches the pattern head concept <Employee> and matches on the expression (like name "J*") (assuming a regular expression oriented pattern is supported by the 'like' function). |

The configuration of the tuple space coupled with the complementary expression language, where a tuple space is the native evaluation context and where an expression is a tuple space, is advantageous in that it allows the query by template aspect of the tuple space to support much more flexible matching. Features which rely on the core pattern matching capability (e.g., observers and conditions within rules) inherit the benefit of expression oriented matching, and expressions can themselves be content for spaces or queries.

Referring back to FIG. 6, at step 164, system 10 provides an application programming interface for deriving a contextual hierarchical address for each tuple space. Each hierarchical address may be unique. The application programming interface provides a function for returning a hierarchical address of a tuple space within the hierarchy of nested tuple spaces.

System 10 supports query and traversal of the 'ancestor' axis of the hierarchy of spaces by defining parenting functions in the application programming interface. For example:

URI getURI( )—returns the hierarchical address of a Space within a hierarchy

Space getParent( )—returns the parent space;

(private) Space setParent(Space parent)—the parent of a Space is internally set when it is nested within another space.

At step 166, system 10 associates a unique identifier with each tuple space. The identifier is an address of the tuple space within an enclosing tuple space, where the address is unique between two or more tuple spaces of the same concept or same head concept. In some embodiments of the present invention when the data structure is an atomic data type the system 10 will use the atomic data type as the identifier.

System 10 supports hierarchical addressing of spaces with potentially the same head concept using the identifier. The application programming interface may include:

Space getId( )—retrieves the identifier of a space

Space createId( )—creates a new identifier in a space

At step 168, system 10 configures an event model 72 such that, in operation, the functions of the application programming interface for the data structure (e.g. tuple space) generate one or more events within an enclosing tuple space describing a query or change in contents of the enclosing tuple space.

Each event may comprise:

a reference to the space where the change in contents originated;

an application programming interface relating to the query or change (e.g., put/get/take/modify); and values (before and after values) of the tuple space where the change in contents originated;

phase of the change (pre or post)

System 10 may implement a two-phase event model 72. The type of change may be one of two phases: a 'pre' phase for queries or changes that are about to occur in the contents and a 'post' phase for queries or changes that have occurred in the contents.

At step 170, system 10 implements an observer component 74 to define observers. Each observer identifies one or more application programming interface functions of interest and a pattern describing a configuration of a tuple space of interest. For example, an observer may provide a configuration of nested spaces defining: a pattern of interest; application programming interfaces of interest; an order of interest; and a reference to the space that is to be notified by system 10. In another embodiment of the invention an observer of multiple correlated concepts can be composed via a rule which looks for some combination of concepts in a space and generates a notification of the occurrence of such combination.

System 10 is operable to nests one or more observers within tuples spaces of the hierarchy of nested tuple spaces such that each observer forms part of the contents of an enclosing tuple space. Each active observer monitors its enclosing tuple space for one or more events associated with the pattern. This allows system 10 to observe any space for events pertaining to an appropriately configured observer therein.

Each observer is a tuple space and system 10 may interact with an observer using the application programming interface for a tuple space. For example, system 10 may nest an observer within the contents of an enclosing space using the function put( ). An observer may invoke a call back handler for providing a notification to subject space when the pattern and function of interest defined by the observer are detected within the tuple space.

Observers observe a subject space for patterns of information appearing or disappearing from the subject space on behalf of the client and notify client data structures when the desired pattern appears in the observed space. Client data structures are described by a hierarchical address which is resolved at the time of notification, and which may represent an in-memory or out of memory data structure. If the client is in-memory the notification will be issued to the client directly via application programming interface invocation; if the data structure is out of memory the notification will attempt to use information (e.g., protocol, host, port, address) contained in the hierarchical address to contact the client data structure. Example protocols include http, https, ftp and webdav.among others.

System 10 may enable or disable an observer (i.e. active or inactive). The status of an observer survives a persistence cycle, such that a space with an enabled observer nested therein can be serialized into memory (e.g. object form) and will retain its enabled status and function. A space that encloses an enabled observer generates events. Observers may also support a 'recursive' mode in which an observer elects to receive events on a matching application programming interface, an order, and a pattern occurring in any child space. All spaces that are children of the observed space also generate events.

Referring back to FIG. 6, at step 172, system 10 implements an event model and propagates events (e.g. changes in a space resulting from get/put/take/modify operations) to interested observers or tuple spaces. That is, system 10 propagates events to active observers of the tuple space where the change in contents originated and then to one or more active observers in one or more enclosing tuple spaces via an application programming interface In order to propagate events, the application programming interface may provide a function for notifying one or more enclosing tuple spaces of a change in the contents of a nested tuple space.

In accordance with some embodiments of the present invention, in operation, the function for notifying:

(a) locates active observers within the contents of the current tuple space and querying the active observers for interest in the event (e.g. application programming interface function call, the phase of the event, the subject data structure originally operated upon by the api and the current data structure processing the event)

(b) queues a notification to each of the one or more interested observers;

(c) propagates the event to enclosing spaces to look for additional active observers interested in the event until there are no more enclosing spaces or observers in any more distant ancestor space; and (d) issues the queued notifications to interested observers System 10 may notify observers only if the event subject/order/api matches the observer pattern/order/api.

The function of the two phase event cycle is to permit a change to be blocked by some observer who may wish to object during the pre phase.

For example, the 'pre' phase of the event model 72 allows changes to be vetoed by an observer of a space, which has the effect of disallowing the change and propagating an exception to the invoker of the application programming interface originating the change.

The 'post' phase of the event model 72 propagates changes to an observer or space at the completion of the change. In each case, pre and post, application programming interface events propagate in the same manner from the subject space in which some action has occurred outwards to enclosing spaces on the ancestor axis via the parent concept, and in each case, pre and post, observers in an ancestor space are matched to the application programming interface invocation, order and subject space using the tuple space matching algorithm, which matches the observer pattern and subject by concept and nested concepts, not just by the head concept.

In each phase the event model includes a 'before' and 'after' state of the tuple space which is the subject of the application programming interface invocation. The 'before' and 'after' states for each pre-phase and the post-phase propagate to the enclosing spaces with the event. To optimize the generation of 'before' and 'after' state propagation within the event model embodiments of the invention may utilize a technique by which both states (before and after) exist simultaneously as a superposition of states within a hierarchy of tuple spaces and the particular state desired for matching is provided as an argument to the matching algorithm application programming interface or derived by other means within the matching api.

For example, in operation, the function for notifying may first notify the tuple space that is the subject of the change, and then notify one or more tuple spaces that are ancestors in the hierarchy of nested tuple spaces.

At step 174, system 10 nests one or more rules within one or more tuple spaces such that each rule forms part of the contents of an enclosing tuple space. System 10 nests rules in order to configure the enclosing space. System 10 implements rules as it does observers.

Each rule may include:

nested tuple spaces defining antecedent conditions of the rule, nested tuple spaces defining consequent actions of the rule, nested tuple spaces for storing a state of a matching algorithm.

Thus, a rule contains a sequence of condition patterns defining a fact of interest to the rule and a sequence of action expressions.

Nested rules may be inactive or active. System 10 activates a rule to support reasoning or forward chaining within an enclosing tuple space When activated, system 10 creates or activates Condition objects, which function as observers and begin to receive and process events that match the pattern of interest to the rule.

Each rule is a tuple space and system 10 may interact with a rule using the application programming interface for a tuple space. Rules may find unifications of variable bindings across multiple concepts. That is, system 10 uses rules to correlate facts across multiple concepts. System 10 supports pattern matching between facts of multiple concepts.

An example rule is a production rule. Production rules process events to generate productions within the rule; each production is a binding set containing zero or more nested tuple spaces. Production rules provide a reasoning mechanism for an enclosing tuple space and when a rule is fired it applies a set of actions to the productions gathered by the Rule.

Before activation in a space the internal structure of a rule is primarily a nested space of conditions and a nested space of actions but may include additional descriptive information for example a name, description, author, etc.

When an active rule condition receives a notification, the rule causes the subject of the notification (i.e. the fact that has been added, removed or changed by the operation of a function) to propagate through the pattern matching network (e.g. RETE) of the rule. This may cause productions to be added to or removed from the terminal node of the Rule, or added to or removed from the matching network within the Rule.

After activation, a rule creates various additional internal structures in object form, including:

Conditions—a kind of Observer space which hooks itself onto the event model 72 of the enclosing space by the head concept of one condition within the rule. Conditions filter out facts that do not match intra-fact select tests; store facts in alpha memory which do match all intra-fact tests; and forward matching facts to the beta portion of the network. System 10 may nest conditions within the enclosing space itself in a manner that supports condition sharing between rules.

Joins—a kind of space which unifies facts arriving from conditions against binding sets in beta memory and which finds unifications of binding sets against facts per the RETE algorithm. Joins implement the beta network and beta memory and forward matching bindings to subsequent Joins per the RETE algorithm.

Terminal—a kind of join space which gathers binding sets that have propagated through all join nodes in a rule. Such binding sets are commonly called 'productions' and are later operated upon by an agenda.

Referring back to FIG. 6, once notifications have been processed by rules, at step 176, system 10 activates an agenda. The agenda implements a conflict resolution algorithm to determine the order to process generated productions.

After an operation of any function, the agenda queries an enclosing tuple space for rules that have generated productions. Agenda processes each generated production in an order defined by a conflict resolution algorithm until no additional productions exist.

Firing the rules in a given space causes that space to first look for an agenda which if found is utilized; failing that a predefined default agenda will be utilized.

One embodiment of a default agenda processes productions using a simple salience of rules in which rules occurring in a space first are considered to be of higher salience and processed first. In this embodiment of a default agenda the salience of a rule may be increased or decreased by simply moving the rule forward or backward within the sequence defined by the enclosing space.

In some embodiments the default agenda may be replaced by defining a custom agenda as a kind of space and putting it into a space. System 10 may interact with a custom agenda using the tuple space application programming interfaces.

Using rules, system 10 may configure a wide range of behaviors, including: data access control, data domain and range constraints, forward or backward chained reasoning, data validation, data transformation, data migration from one space to another under the control of expressions driven by rules.

For example, system 10 may provide a business rules engine 76. A business rules engine 76 is a production matching system that supports pattern matching between facts and production rules.

Business rules engine 76 may include:

a working memory implemented as a hierarchy of nested tuple spaces;

a processor configured to interface with the application programming interface for a tuple space; and a rulebase containing production rules.

System 10 makes no distinction between the type or class of the rulebase and the type or class of facts or rules within the rule base. The rule base is a tuple space, and facts and rules are also tuple spaces. The working memory is also a tuple space. In this configuration, rules may be queried by template using the application programming interface of the tuple space. A rule is of the same type or kind as a fact. System 10 can reason about rules and rules may be conditions for other rules.

The business rules engine 76 implements a matching algorithm for matching facts to rules. The matching algorithm may be the RETE algorithm for example. Condition nodes may be nested into an enclosing space and implement the type, select, alpha memory portions of the RETE network. System 10 forwards matching facts to production rules and implements the beta portions of the RETE network in the form of join and terminal nodes.

In operation, system 10 asserts facts into the working memory. Production rules operate on the facts in the working memory to generate one or more productions.

As an illustrative example, consider the following production rules:

Rule1: Father(x, y) implies Parent(x, y)

Rule1: Mother(x,y) implies Parent(x, y)

Rule3: Parent(x, y) and Parent(x, z) implies Sibling(y, z)

Rule 1 (R1) and Rule 2 (R2) each make Parent (x) and Child (y) inferences from Father and Mother facts asserted onto the working memory of the business rules engine 76. Rule 3 (R3) finds unifications of Parent facts to infer Sibling relationships.

As an example, system 10 may assert the following facts into the rule base of the business rules engine 76:

F1: Father(John, Mary) (assert)

F2: Father(John, James) (assert)

System 10 may find unifications and produce additional facts in the working memory of the rule base:

F3: Parent(John, Mary) by F1, R1 and the unification x=John, y=Mary.

F4: Parent(John, James) by F2, R1 and the unification x=John, y=James

F5: Sibling(Mary, James) by F3, F4, R3 and the unification x=John, y=Mary, z=James System 10 may support unification of facts against rules by implementing one or more production matching algorithms. The matching algorithm is implemented as a network 200 which includes nodes for intra-fact tests, an alpha memory, nodes for inter-fact correlations across two concepts, a beta memory and Terminal nodes which hold productions for facts which have passed all intra and inter fact tests for some Rule.

Example matching algorithms include RETE, TREAT and LEAPS. The algorithm generally attempts to minimize the number of comparisons that must be incrementally evaluated when the working memory is modified by the assertion or retraction or modification of rules or facts in the business rules engine 76.

Figure 8:
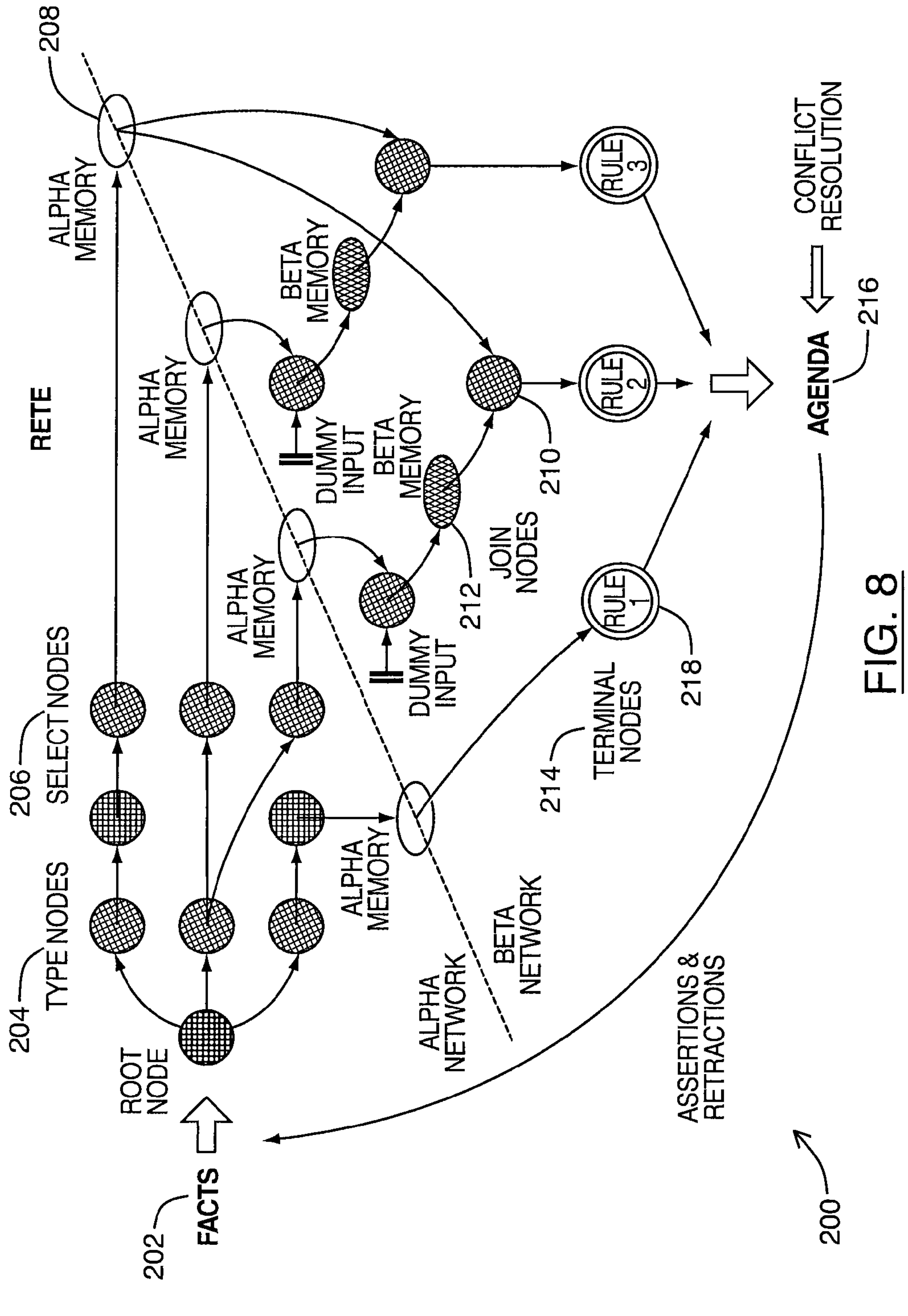
FIG. 8 is a block diagram illustrating the components of a RETE network.

Referring now to FIG. 8, there is shown a block diagram illustrating the components of an example pattern matching network. As an example, a RETE network 200 is shown.

Facts 202 enter the working memory and into the RETE network 200. Facts 202 are categorized by type nodes 204 and traverse through a series of select nodes 206 which perform intra-fact tests. These do not require correlation with other facts and instead the fact is compared against constants or expressions within the fact. Facts passing all intra-fact tests enter an alpha memory 208 and are fed into the top of the 'beta' network.

The beta network is responsible for performing inter-fact correlations or unifications. Each join node 210 finds a unification of bindings across two concepts. The network of join nodes 210 and beta memories 212 represent facts 202 which have matched some of the inter-fact correlations specified by a set of production rules 218. Facts 202 which pass all intra and inter fact tests enter a terminal node 214 as binding sets or 'productions'. An agenda 216 operates on one or more productions generated by the production rules 218.

Given that the pattern matching aspect of a tuple space pertains to a single concept then it is clear that tuple space oriented matching can support only the alpha portion of the RETE network 200; therefore in order to support the kind of inter-concept correlations required for production matching the system 10 provides additional application programming interfaces and logic to support the beta portion of the RETE network 200 and inter-fact unification as well.

In accordance with other embodiments of the present invention, rules may be another form of rule other than production rules. System 10 may treat rules having only have one 'when' clause as if-then style event/condition/action rules rather than production rules. These rules are supported by a simplified matching network consisting of only a condition and a terminal rather than by a network of condition, join and terminal nodes. A rule with only one 'when' clause has only one concept of interest and therefore may not require correlation among multiple facts and system 10 is not required to implement a join network and alpha/beta memory but is still governed by an agenda.

Figure 9:
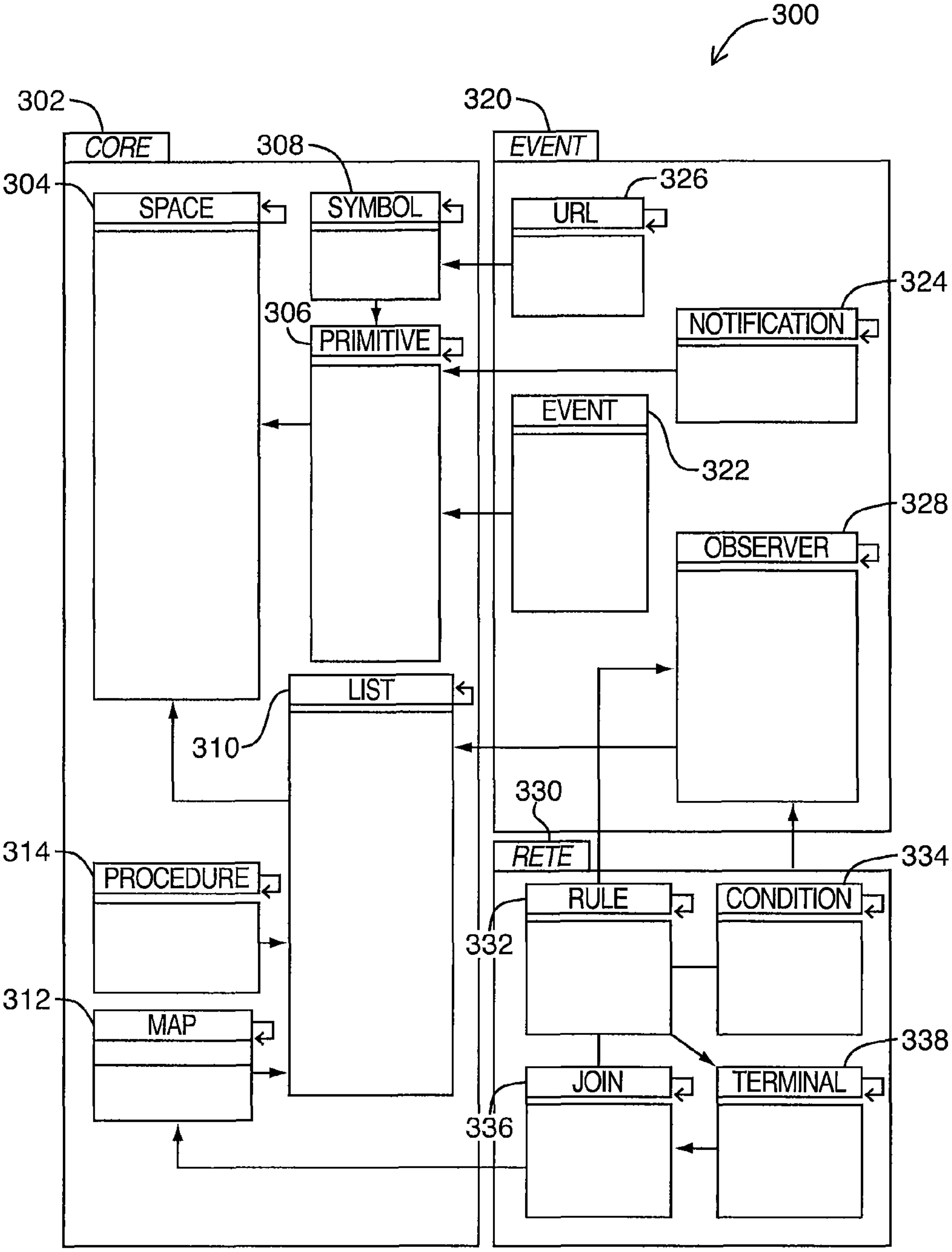
FIG. 9 is a block diagram illustrating an example Unified Modeling Language representation of an embodiment of the present invention.

Reference is now made to FIG. 9, which is a UML package and class diagram representation of one embodiment of the present invention. Package core 302 contains representations of key concepts of the invention in class form, and may include the following classes:

Space class 304 is an abstract class defining the base tuple space application programming interface and providing a default implementation for other application programming interfaces based on more specialized concepts.

Primitive class 306 is a kind of space which represents primitive types (numbers, strings, etc).

Symbol class 308 is a kind of primitive class which represents Strings that are to be treated as Symbols.

List class 310 is a kind of Space which represents aggregate Lists of Spaces.

Map class 312 is a kind of List in which Symbols have a 1:1 mapping to Spaces.

Procedure class 314 is a base class for procedures within the Expression Language.

Package event 320 contains class definitions supporting events and observers and may include the following classes:

Event class 322 is a representation of an Event propagating through the system.

Notification class 324 is an Event and a reference to an associated Observer that will be notified.

URI class 326 is a hierarchical address of a Space. The Space itself may be resolved by evaluating the URI in some context.

Observer class 328 is a class which looks for a pattern of interest in a Space and causes an associated subscriber Space to be notified when such patterns occur.

Package RETE 330 contains class definitions supporting Rules and may include the following classes:

Rule class 332 is a kind of Observer which looks for one or more patterns in a space and generates productions when those patterns are observed.

Condition class 334 is a kind of Observer which implements the 'alpha' portion of the RETE network including type nodes, select nodes and alpha memory Join class 336 is a kind of Space which implements the 'beta' portion of the RETE network, including join nodes and beta memory.

Terminal class 338 is a kind of Space which gathers productions matching the when clauses in a Rule. These are operated on by either the default Agenda or by a custom Agenda.

In some embodiments an Agenda class (not shown) may be added to define a non-default implementation of a conflict resolution strategy for processing productions gathered by one or more Rules in a Space.

In accordance with other embodiments of the present invention, system 10 provides a user interface 80 for building software applications based on a hierarchy of nested tuple spaces, where the user interface 80 provides a presentation layer for the application programming interface of a tuple space.

Figure 10:
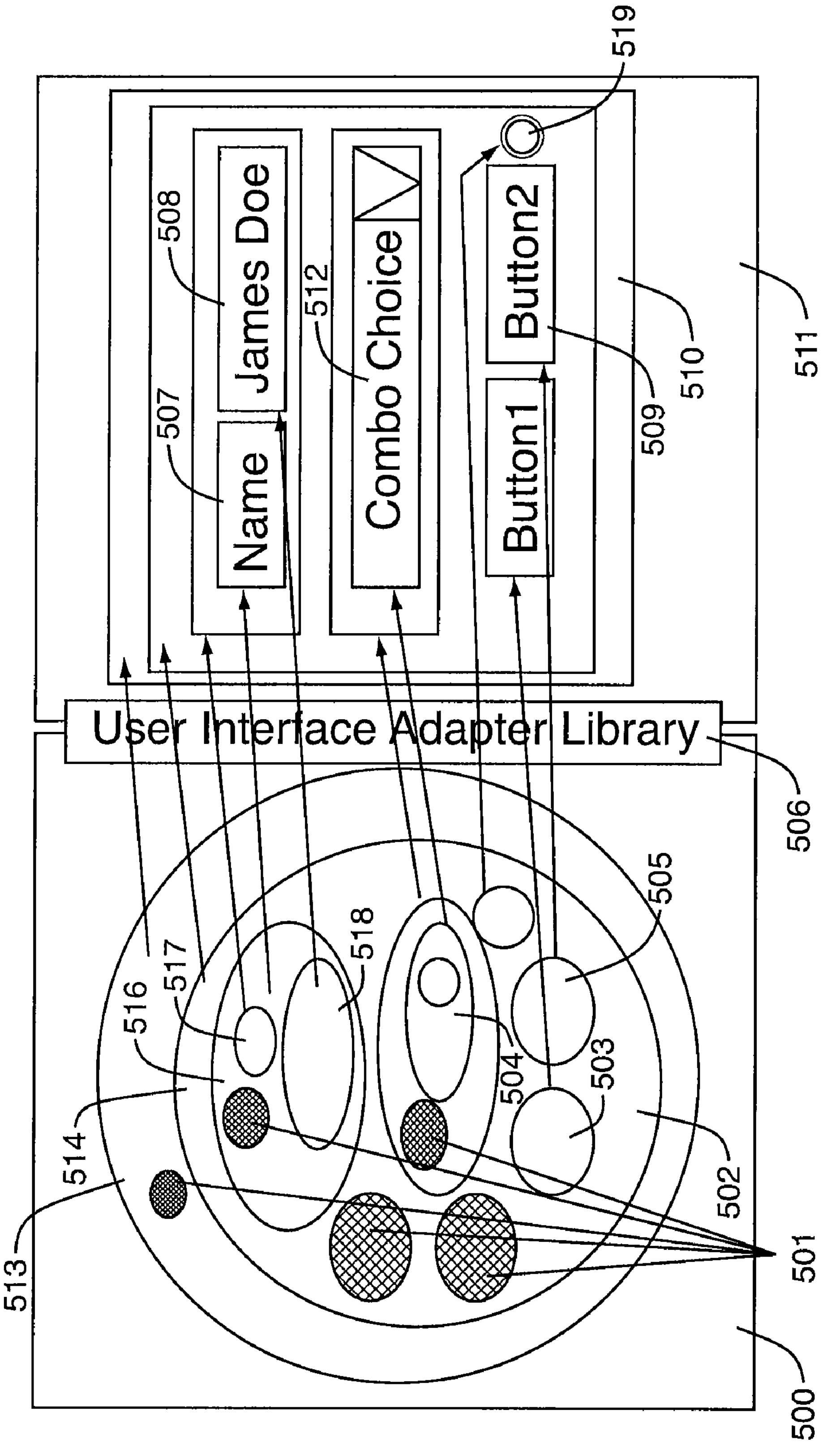
FIG. 10 is block diagram illustrating an example of a user interface for building a computing platform based on a hierarchy of nested data structures integrated with an application programming interface in accordance with embodiments of the present invention.

Reference is now made to FIG. 10, which illustrates a graphical user interface 80 integrated with the application programming interface for a tuple space for building a computing platform based on a hierarchy of nested tuple spaces in accordance with embodiments of the present invention.

Embodiments of the invention support integration of a graphical user interface 80 by associating tuple spaces within a hierarchy of tuple spaces 513 to user interface 80 elements within a hierarchy of user interface 80 elements 510. A display adapter 511 may display user interface 80 elements using a user interface 80 adapter library 506 specialized for one or more interface technologies, such as HTML, SVG, JavaFx, Java2D or Java3D or VoiceXML for example.

The user interface 80 adapter library 506 may transform a plurality of primitive user interface 80 markup concepts, for example size, x and y position, color, border, font, transparency, editable, pickable and scale concepts, onto technology specific application programming interfaces. In this configuration, user interface 80 markup concepts within a hierarchy of tuple spaces are rendered in a hierarchical fashion to an associated display device while preserving the semantics of the markup.

For example, the space 518 has the head concept TEXT and nested concepts editable, transparency, x position, y position and model. The user interface 80 adapter library 506 uses these concepts to guide the rendering of the associated user interface 80 element 508 (i.e. TEXT widget) such that the visual representation is that of an editable text box having the x position, y position, transparency and model concepts specified by the backing space 518.

As another example, the space 516 contains a border concept with nested border width concepts and border color concepts, and is generically rendered to the effect of defining a group 519.

The user interface 80 adapter library 506 may support various intrinsic 'widget' concepts including text, lists, drop lists, images and buttons, for example. For example, user interface 80 element 512 is a drop list of combo choices associated with space 504. As another example, user interface 80 element 509 is a button associated with space 505. user interface 80 element 507 is a text box associated with space 516. The widget concepts may be used to create aggregate components by composing the desired structure of spaces and annotating these with the desired primitive user interface 80 markup, core widgets, and rules to tie the behavior of the widgets to the contents of the space.

The user interface 80 adapter library 506 may handle user interactivity such that changes originated by a user to user interface 80 elements are reflected in the backing space. For example a user typing into the TEXT widget 508 triggers modify( ) application programming interface calls to the associated model, which is described by the backing tuple space 518. This has the effect of propagating events through the enclosing spaces 518, 516, 514, and 513. The propagation of events to enclosing spaces may potentially trigger rules 501 within these enclosing spaces based on e.g., the configuration of pattern(s) in the when clause of each rule.

Rules 501 may have the effect of adding, removing or modifying data within the hierarchy of spaces visually displayed which may have the effect of adding, removing or modifying widgets displayed on the user interface 80.

Figure 11:
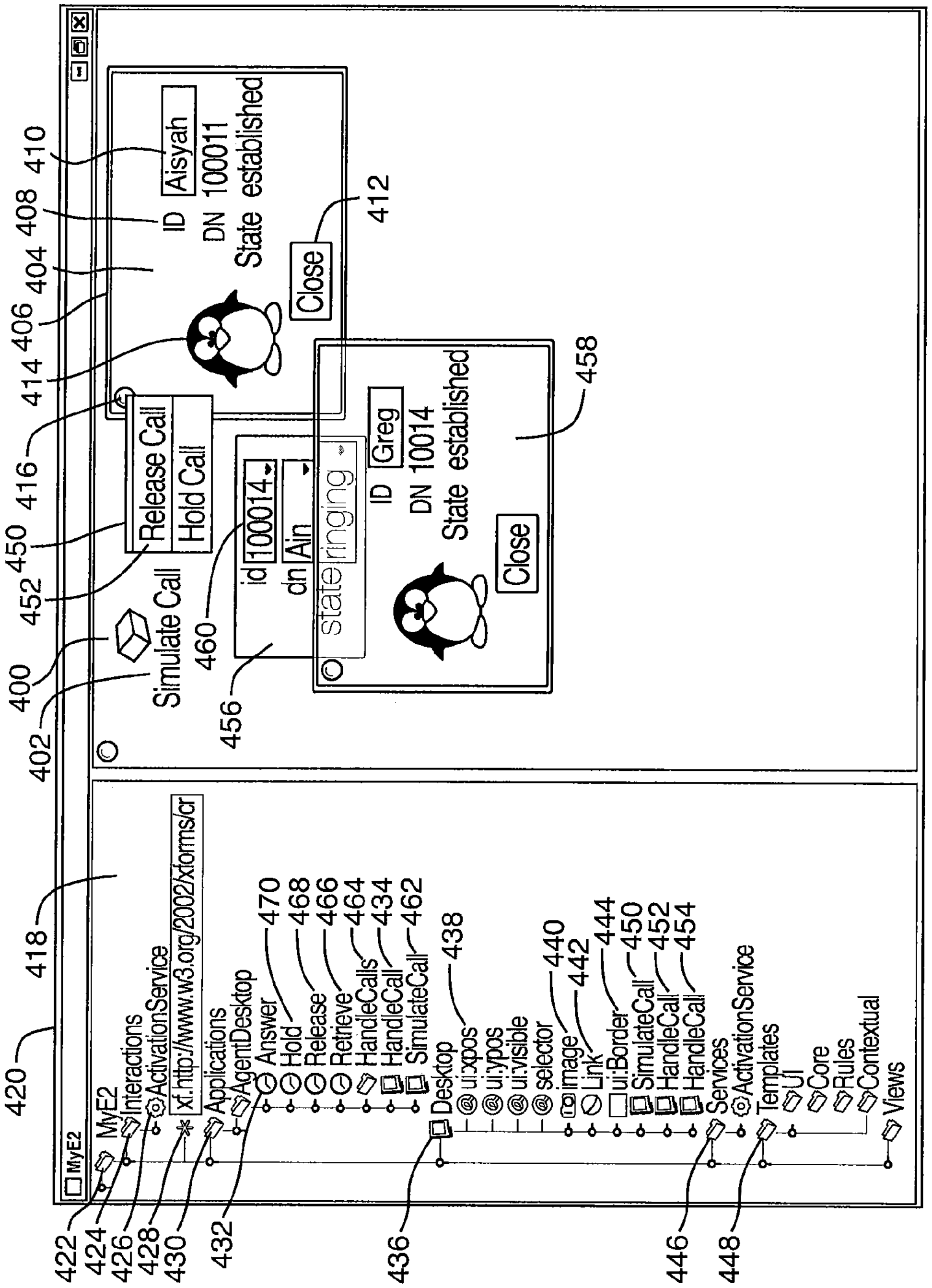
FIG. 11 is block diagram illustrating a user interface for building a computing platform based on a hierarchy of nested tuple spaces in accordance with embodiments of the present invention.

Reference is now made to FIG. 11, which illustrates a graphical user interface 80 development environment and User Agent 420 (i.e. user interface 80) for a computing platform based on a hierarchy of nested tuple spaces (400 to 458) in accordance with embodiments of the present invention.

The User Agent 420 includes a tree representation of hierarchical Spaces 418 having a root space 422 which is serialized to and from a secondary representation on disk in this embodiment using XML syntax.

The User Agent 420 includes a 2D representation of this hierarchy of spaces 400 which is dynamically rendered in accordance to templates residing within a Template space 448.

The 2D representation 400 shows various concepts located in the desktop space 436 rendered in 2D fashion including a graphical shortcut 402; forms 406, 456 and 458 with nested controls label 408; edit box 410; button 412; image 414; context menu activator 416; context menu 450; context menu item 452; and combo box 460.

Components displayed within the 2D representation 400 are associated with spaces and draw their visual rendering cues from those spaces, including for example the background image 440 and border 444 which pertain to the viewport displayed by the 2D representation 400. Additional rendering cues are defined by concepts (not shown) including Fonts, Colors, Transparency, visible and selectable attributes, among others.

The user interface 80 concepts outlined above are interpreted by the 2D representation 400 to the effect that borders, colors, transparencies, images, fonts, etc can be configured by the end user simply by putting the appropriate user interface 80 concepts into the desired spaces and by adjusting the specific attributes of each and by moving the nested contents of the space in order to establish x,y and z positions within the 2D representation 400.

The User Agent 420 operates using a self contained Service Oriented Architecture in which Services observe a Space for patterns of interest representing requests, and in response perform a service on behalf of the consumer. In this realization a copy of the ActivationService 426 is put within the Interactions Space and thereby monitors that space for ActivationRequest concepts.

ActivationRequest concepts represent requests to copy or remove concepts from one space and into another. Such requests are processed by the ActivationService 426 by extracting source and target concepts; locating the corresponding concepts; and performing the copy/move/delete as requested. Remote references may also be processed using a specifiable protocol.

To further elaborate on this process a user activating the shortcut 402 causes an ActivationRequest concept to be configured with source concept 'Simulate Call' 462 and target concept 'Desktop' 436 and placed within the Interactions Space 424.

On receiving an ActivationReqeust the Infractions Space 424 finds interested observer ActivationService 426 and notifies that observer of the request.

The ActivationService 426 responds to the notification by first removing the request from the space (as is typical of the blackboard metaphor to prevent another service from duplicating the effort) and by subsequently locating the desired source and target spaces and copying the source space into the target space.

As a result of the user activating the shortcut 402 a copy of the Simulate Call space 462 is placed in the desktop space 436, where it is rendered by the 2D representation 400 to the form 456.

Form 456 contains a number of form elements which are dynamically rendered from a model 'call' concept within the form space in the manner of xforms. Selecting the 'OK' button (not visible) on form 456 causes a copy of that model to be populated with form data and put into the 'Handle Calls' Space 464.

The Handle Calls space 464 is configured with rules which trigger the movement (via the activation service) of a 'Handle Call' concept 434 to the Desktop space 436 for each instance of a 'ringing' call concept detected; and to move the call concept into the associated handle call instance. Doing so has the effect of causing the 2D representation 400 to display 458 and 404, which represent distinct call instances.

Within forms 458 and 404 call data is bound to form elements using an xforms oriented data binding model and presented visually in form elements.

Rules within each 'handle call' space maintain options for associated context menu 50 by putting and taking contextMenuItem concepts from the enclosing space based on call state. (for example when a call is ringing only the 'answer' option is presented; when it is ringing only the 'release' option is presented; when it is established the 'hold' and 'release' options are presented).

The context menu 450 is activated by selecting an activator 416; the menu dynamically renders whatever contextMenuItem concepts are present in its enclosing space. When a contextMenuItem 452 is activated the process is similar to the activation process for shortcut 402.

Within the User Agent 420 the tree representation 418 and the 2D representation 400 of the user interface 80 are in effect different visualizations of a hierarchy of spaces and may be driven by rules which invoke only the get/put/take application programming interfaces of the hierarchical tuple spaces in order to effect user interface 80 interaction; business logic; service invocation; data modeling and abstraction.

Embodiments of the present invention provide a simple conceptual model and application programming interface for modeling and implementing software applications, which may be accessible to a wider range of developers, the goal being that if the conceptual framework and application programming interfaces become simple enough conceivably a layperson can become a practitioner with little training.

The present invention has been described here by way of example only. Various modification and variations may be made to these exemplary embodiments without departing from the spirit and scope of the invention, which is limited only by the appended claims.

I claim:

1. A computing platform configured as a hierarchy of nested data structures, the computing platform comprising a processor and memory storing instructions, the instructions being executable to configure the processor to provide:

- an application programming interface for a data structure, wherein each data structure comprises contents, and wherein the application programming interface defines:
  - at least one function for nesting one or more data structures within the contents of an enclosing data structure such that nesting the data structures within the contents of the enclosing data structure results in a hierarchy of nested data structures;
  - at least one function for removing one or more data structures from the contents of the enclosing data structure;
  - at least one function for retrieving one or more data structures from the contents of the enclosing data structure; and
  - at least one function for modifying the contents of one or more data structures;
- wherein each of the plurality of functions receives one or more data structures as a parameter;
- wherein the function for removing and the function for retrieving receives as the parameter a pattern defining a template for one or more data structures of interest, the pattern having a head concept and zero or more nested concepts, wherein the concept is an ordered list of elements identifying a concept name and structure; and
- wherein the function for removing and the function for retrieving matches the contents of the enclosing data structure against the pattern in a recursive manner, matching first by the head concept and then by the zero or more nested concepts;
- an event model and wherein each of the functions generate an event by invoking an event notification function to signify a query of the data structure or a change in contents of the data structure;
- one or more observers, each observer defining one or more functions of interest; one or more phases of interest; and a pattern describing a configuration of a data structure of interest;
- wherein each observer is embodied as a data structure;
- wherein each observer may be active or inactive; and
- wherein each active observer monitors its enclosing data structure for one or more events associated with the pattern.

2. The computing platform of claim 1 wherein each observer may be nested into an enclosing data structure such that the observer forms part of the contents of the enclosing data structure.

3. The computing platform of claim 1 wherein each event propagates to an active observer of the data structure where the change in contents originated and then to one or more active observers in one or more enclosing data structures.

4. The computing platform of claim 1 wherein the application programming interface further defines at least one function for notifying one or more enclosing data structures of a change in the contents of a nested data structure.

5. The computing platform of claim 4 wherein the at least one function for notifying operates by (a) locating one or more active observers of an observed data structure, and querying the one or more active observers for interest in the event; (b) queuing a notification to each of the one or more active observers interested in the event; (c) propagating the event to one or more data structures enclosing the subject data structure; (d) issuing the queued notifications to observers interested in the event.

6. The computing platform of claim 4 wherein the at least one function for notifying operates by first notifying the data structure that is the subject of the change, and then by notifying one or more data structures that are ancestors in the hierarchy of nested data structures.

7. The computing platform of claim 4 wherein the function for notifying notifies the data structure of the change within its contents using the pattern received as the parameter of the function.

8. The computing platform of claim 1 wherein each observer supports a call back handler for providing a notification to a data structure when the pattern and the function of interest defined by the observer are detected within the observed data structure.

9. The computing platform of claim 1 wherein the hierarchy of nested data structures may be queried for one or more observers using one or more of the plurality of functions and the pattern defined by the observer.

10. The computing platform of claim 1 further comprising one or more rules for generating productions, wherein each rule comprises:

nested data structures defining antecedent conditions of the production rule;

nested data structures defining consequent actions of the production rule; and nested data structures for storing a state of a matching algorithm;

wherein each rule is embodied in a data structure;

wherein each rule can be nested into an enclosing data structure such that the rule forms part of the contents of its enclosing data structure; and wherein each rule is capable of processing events to generate one or more productions wherein each production is a binding set containing zero or more data structures.

11. The computing platform of claim 10 wherein the instructions further configure the processor to provide a default agenda;

wherein, after an operation of any of the functions, the agenda queries an enclosing data structure for rules having generated one or more productions, and wherein the agenda causes the rules to fire actions on each generated production in a sequence until no additional productions exist; and wherein the agenda supports a salience of rules of its enclosing data structure by virtue of the order in which the rules are nested within the enclosing data structure.

12. The computing platform of claim 11 wherein the instructions further configure the processor to provide a custom agenda, wherein the custom agenda is embodied in a data structure and is operable to be nested within an enclosing data structure to override the behavior of the default agenda.

13. The computing platform of claim 10 wherein a rule is capable of reasoning about another rule.

14. The computing platform of claim 10 wherein the plurality of functions further includes a function for finding unifications of variable bindings across a plurality of concepts.

15. The computing platform of claim 1 wherein the instructions further configure the processor to provide an ontology component to define one or more concept membership sets, wherein the concept membership set is an ordered set of elements identifying one or more concepts, wherein each data structure is associated with a concept membership set, wherein the concept membership set for each data structure has a root concept, wherein the root concept is the least specialized concept of the concept membership set, and wherein each data structure can be queried for its entire contents by providing the pattern for the least specialized root concept as a parameter for one of the functions of the application programming interface.

16. The computing platform of claim 1 wherein the instructions further configure the processor to provide:

a user interface library;

a display adapter for displaying a plurality of user interface elements;

a registry of view definitions for rendering patterns associated with the data structures; and a user interface adapter library for associating the plurality of user interface elements with the hierarchy of nested data structures.

17. The computing platform of claim 1 wherein the instructions further configure the processor to provide: a runtime library for implementing the application programming interface on a host operating system; and an executable image embodying the application programming interface in a format suitable for use on the host operating system.

18. The computing platform of claim 1, wherein the function for removing and the function for retrieving are operable to return a hierarchy of nested data structures from the contents of the enclosing data structure, and wherein the returned hierarchy of nested data structures can be queried using the functions defined by the application programming interface.

19. The computing platform of claim 1 wherein the data structure is selected from the group consisting of: a tuple space, an object, and an atomic data type.

20. The computing platform of claim 1, wherein each data structure is associated with an identifier, wherein the identifier is an address of the data structure within an enclosing data structure.

21. The computing platform of claim 1, wherein the instructions further configure the processor to provide an ontology component to define one or more concept membership sets, wherein the concept membership set is an ordered set of elements identifying one or more concepts, and wherein each data structure is associated with a concept membership set.

22. The computing platform of claim 21, wherein each the concept membership set for each data structure has a root concept, wherein the root concept is the least specialized concept of the concept membership set.

23. The computing platform of claim 21, wherein the ontology component is configured to compute and return the concept membership set of a data structure; and wherein the application programming interface further defines at least one function for returning the concept membership set of the data structure, wherein the returned concept membership set is embodied in a data structure.

24. The computing platform of claim 21, wherein each data structure comprises a head concept, wherein the head concept is the most specialized concept of the concept membership set; and wherein the application programming interface further defines at least one function for returning the head concept of the data structure, wherein the returned head concept is embodied in a data structure.

25. The computing platform of claim 24, wherein the data structure comprises an identifier, wherein the identifier is a unique address of the data structure within an enclosing data structure.

26. The computing platform of claim 1 wherein the application programming interface further defines one or more functions for defining "is-a" relationships between two or more concepts.

27. The computing platform of claim 1, wherein the application programming interface further defines a function for serializing the hierarchy of nested data structures to an intermediate form and from the intermediate form while preserving the configuration of the data structure.

28. The computing platform of claim 1, wherein the application programming interface further defines a function for transforming an object form of a hierarchy of nested data structures into a secondary representation suitable for transmission over a network; and a function for transmitting the secondary representation over a network.

29. The computing platform of claim 1, wherein the application programming interface further provides a function for transforming an object form of the hierarchy of nested data structures into a secondary representation suitable for storage; and a function for storing the secondary representation.

30. The computing platform of claim 1 wherein the plurality of functions further comprises a function for creating a copy of the hierarchy of nested data structures.

31. The computing platform of claim 1 wherein the instructions further configure the processor to provide an expression language; wherein the expression language has an evaluation context that is a data structure; wherein the expression language comprises a plurality of functions, wherein each function is embodied in a data structure.

32. The computing platform of claim 1 wherein the application programming interface further defines at least one function for returning a hierarchical address of a data structure within the hierarchy of nested data structures, wherein the hierarchical address is embodied in a data structure.

33. The computing platform of claim 1 wherein the instructions further configure the processor to provide an event model and wherein each of the functions generate an event by invoking an event notification function to signify a query of the data structure or a change in contents of the data structure.

34. The computing platform of claim 33 wherein each event comprises:

a reference to the data structure where the query or change in contents originated;

a type of query or change in contents; and before and after values of the data structure where the query or change in contents originated.

35. The computing platform of claim 34 wherein the event model is comprised of a "pre-phase" for changes or queries that are about to occur in the contents and a "post-phase" for queries or changes that have occurred in the contents.

36. The computing platform of claim 33 wherein for each of the "pre-phase" and the "post-phase" the event model determines a before state and an after state of the tuple space which is the subject of the event.

37. A business rules engine comprising:

a working memory, wherein the working memory is implemented as a hierarchy of nested data structures;

a processor configured to interface with an application programming interface defining a plurality of functions:

at least one function for nesting one or more data structures within an enclosing data structure;

at least one function for removing one or more data structures from an enclosing data structure;

at least one function for retrieving one or more data structures from an enclosing data structure; and at least one function for modifying one or more data structures;

wherein each of the plurality of functions receives one or more data structures as a parameter;

wherein the function for removing and the function for retrieving receives as the parameter a pattern defining a template for one or more data structures of interest, the pattern having a head concept and zero or more nested concepts, wherein the concept is an ordered list of elements identifying a concept name and structure; and wherein the function for removing and the function for retrieving matches the contents of the enclosing data structure against the pattern in a recursive manner, matching first by the head concept and then by zero or more nested concepts;

a rulebase comprising a plurality of rules, wherein each rule is embodied as a data structure and comprises:

a nested data structure for storing the antecedent conditions of the rule;

a nested data structure for storing the consequent actions of the rule; and a nested data structure for storing the state of a matching algorithm;

wherein, in operation, facts can be asserted into the working memory, wherein each fact is embodied in a data structure; and wherein, in operation, the plurality of rules operate on the facts in the working memory to generation one or more productions.

38. The business rules engine of claim 37 wherein the rule base supports pattern matching between facts across a plurality of concepts.

39. The business rules engine of claim 37 wherein the matching algorithm implements a network in the working memory, the network comprising a plurality of nodes for intra-fact tests, an alpha memory, a plurality of nodes for inter-fact correlations across two concepts and a beta memory.

40. The business rules engine of claim 39 wherein the matching algorithm is implemented as the RETE algorithm.

41. The business rules engine of claim 37 further comprising an agenda for operating on one or more productions generated by the production rules.

42. A non-transitory physical computer-readable medium upon which a plurality of instructions are stored, the instructions being executable to configure a processor to provide the business rules engine as defined in claim 37.

* * * * *